United States Patent
Rao et al.

(10) Patent No.: US 12,458,436 B2
(45) Date of Patent: Nov. 4, 2025

(54) FLEXIBLE-CIRCUIT TIP FOR A SPLIT-TIP CATHETER

(71) Applicant: BIOSENSE WEBSTER (ISRAEL) LTD., Yokneam (IL)

(72) Inventors: Anand Rao, Tustin, CA (US); Christopher T. Beeckler, Brea, CA (US); Rajesh Pendekanti, Chino Hills, CA (US); Keshava Datta, Chino Hills, CA (US)

(73) Assignee: BIOSENSE WEBSTER (ISRAEL) LTD., Yokneam (IL)

( * ) Notice: Subject to any disclaimer, the term of this patent is extended or adjusted under 35 U.S.C. 154(b) by 1108 days.

(21) Appl. No.: 16/502,020

(22) Filed: Jul. 2, 2019

(65) Prior Publication Data

US 2020/0030024 A1    Jan. 30, 2020

Related U.S. Application Data

(60) Provisional application No. 62/711,708, filed on Jul. 30, 2018.

(51) Int. Cl.
  *A61B 18/14*  (2006.01)
  *A61B 5/00*   (2006.01)
  (Continued)

(52) U.S. Cl.
  CPC .......... *A61B 18/1492* (2013.01); *A61B 5/287* (2021.01); *A61B 5/33* (2021.01);
  (Continued)

(58) Field of Classification Search
  CPC ... A61B 18/1492; A61B 5/287; A61B 5/4836; A61B 2018/00351; A61B 2018/00577;
  (Continued)

(56) References Cited

U.S. PATENT DOCUMENTS

D123,782 S   12/1940 Lux
3,316,896 A   5/1967 Thomasset
(Continued)

FOREIGN PATENT DOCUMENTS

CN    1225027 A    8/1999
CN  101422637 A    5/2009
(Continued)

OTHER PUBLICATIONS

Extended European Search Report for Application No. EP17168393.1 mailed on Dec. 15, 2017, 12 pages.
(Continued)

*Primary Examiner* — Thomas A Giuliani
*Assistant Examiner* — Abigail M Ziegler
(74) *Attorney, Agent, or Firm* — Etan S. Chatlynne; Calderon Safran & Wright P.C.

(57) ABSTRACT

A catheter tip may be a fabricated as a planar flexible circuit, e.g., via lithography, as having a first planar segment and a second planar segment that includes various electrodes on different sectors that are insulated from each other. The tip may be deformed to have a non-planar configuration, e.g., cylindrical, and then assembled onto a catheter. The catheter may be used to monitor ECG signals and temperature and to precisely deliver ablative energy to tissues via the various electrodes. ECG signals and temperature may be monitored for one sector while ablation energy is being delivered to another sector.

16 Claims, 12 Drawing Sheets

(51) Int. Cl.
*A61B 5/287* (2021.01)
*A61B 5/33* (2021.01)
*A61N 1/05* (2006.01)
*A61B 18/00* (2006.01)

(52) U.S. Cl.
CPC ............ *A61N 1/056* (2013.01); *A61B 5/4836* (2013.01); *A61B 2018/00351* (2013.01); *A61B 2018/00577* (2013.01); *A61B 2562/227* (2013.01)

(58) Field of Classification Search
CPC ........... A61B 2018/00702; A61B 2018/00714; A61B 2018/00797; A61B 2018/00815; A61B 2018/00821; A61B 2018/00839; A61B 2018/124; A61N 1/056; H05K 1/118; H05K 1/189; H05K 2201/052; H05K 2201/053; H05K 2201/10151
See application file for complete search history.

(56) References Cited

U.S. PATENT DOCUMENTS

| | | | |
|---|---|---|---|
| 4,232,676 A | 11/1980 | Herczog | |
| 4,276,874 A | 7/1981 | Wolvek et al. | |
| 4,587,975 A | 5/1986 | Salo et al. | |
| 4,709,698 A | 12/1987 | Johnston et al. | |
| 4,805,621 A | 2/1989 | Heinze et al. | |
| 5,178,957 A | 1/1993 | Kolpe et al. | |
| 5,391,199 A | 2/1995 | Ben-Haim | |
| 5,429,617 A | 7/1995 | Hammersmark et al. | |
| 5,582,609 A | 12/1996 | Swanson et al. | |
| 5,584,830 A | 12/1996 | Ladd et al. | |
| 5,702,386 A | 12/1997 | Stern et al. | |
| 5,797,903 A | 8/1998 | Swanson et al. | |
| 5,860,974 A | 1/1999 | Abele | |
| 5,971,983 A | 10/1999 | Lesh | |
| 6,012,457 A | 1/2000 | Lesh | |
| 6,024,740 A | 2/2000 | Lesh et al. | |
| 6,042,580 A | 3/2000 | Simpson | |
| 6,091,993 A | 7/2000 | Bouchier et al. | |
| 6,123,718 A | 9/2000 | Tu et al. | |
| 6,142,993 A | 11/2000 | Whayne et al. | |
| 6,164,283 A | 12/2000 | Lesh | |
| 6,171,275 B1 | 1/2001 | Webster, Jr. | |
| 6,176,832 B1 | 1/2001 | Habu et al. | |
| 6,226,542 B1 | 5/2001 | Reisfeld | |
| 6,239,724 B1 | 5/2001 | Doron et al. | |
| 6,301,496 B1 | 10/2001 | Reisfeld | |
| 6,322,559 B1 | 11/2001 | Daulton et al. | |
| 6,325,777 B1 | 12/2001 | Zadno-Azizi et al. | |
| 6,332,089 B1 | 12/2001 | Acker et al. | |
| 6,380,957 B1 | 4/2002 | Banning | |
| 6,402,740 B1 | 6/2002 | Ellis et al. | |
| D462,389 S | 9/2002 | Provence et al. | |
| 6,471,693 B1 | 10/2002 | Carroll et al. | |
| 6,484,118 B1 | 11/2002 | Govari | |
| 6,522,930 B1 | 2/2003 | Schaer et al. | |
| 6,618,612 B1 | 9/2003 | Acker et al. | |
| 6,656,174 B1 | 12/2003 | Hegde et al. | |
| 6,690,963 B2 | 2/2004 | Ben-Haim et al. | |
| 6,814,733 B2 | 11/2004 | Schwartz et al. | |
| 6,892,091 B1 | 5/2005 | Ben-Haim et al. | |
| 6,893,433 B2 | 5/2005 | Lentz | |
| 6,986,744 B1 | 1/2006 | Krivitski | |
| 6,997,924 B2 | 2/2006 | Schwartz et al. | |
| 7,156,816 B2 | 1/2007 | Schwartz et al. | |
| 7,340,307 B2 | 3/2008 | Maguire et al. | |
| 7,442,190 B2 | 10/2008 | Abboud et al. | |
| 7,536,218 B2 | 5/2009 | Govari et al. | |
| 7,756,576 B2 | 7/2010 | Levin | |
| 7,842,031 B2 | 11/2010 | Abboud et al. | |
| 8,048,032 B2 | 11/2011 | Root et al. | |
| 8,231,617 B2 | 7/2012 | Satake | |
| 8,267,932 B2 | 9/2012 | Baxter et al. | |
| 8,357,152 B2 | 1/2013 | Govari et al. | |
| D682,289 S | 5/2013 | Dijulio et al. | |
| D682,291 S | 5/2013 | Baek et al. | |
| D690,318 S | 9/2013 | Kluttz et al. | |
| D694,652 S | 12/2013 | Tompkin | |
| 8,641,709 B2 | 2/2014 | Sauvageau et al. | |
| 8,721,590 B2 | 5/2014 | Seward et al. | |
| 8,777,161 B2 | 7/2014 | Pollock et al. | |
| D716,340 S | 10/2014 | Bresin et al. | |
| 8,852,181 B2 | 10/2014 | Malecki et al. | |
| D720,766 S | 1/2015 | Mandal et al. | |
| D721,379 S | 1/2015 | Moon et al. | |
| D724,618 S | 3/2015 | Shin | |
| 8,974,450 B2 | 3/2015 | Brannan | |
| 8,998,893 B2 | 4/2015 | Avitall | |
| D729,263 S | 5/2015 | Ahn et al. | |
| 9,089,350 B2 | 7/2015 | Willard | |
| D736,780 S | 8/2015 | Wang | |
| 9,126,023 B1 | 9/2015 | Sahatjian et al. | |
| D740,308 S | 10/2015 | Kim et al. | |
| D743,424 S | 11/2015 | Danielyan et al. | |
| D744,000 S | 11/2015 | Villamor et al. | |
| 9,173,758 B2 | 11/2015 | Brister et al. | |
| D747,742 S | 1/2016 | Fan et al. | |
| D750,644 S | 3/2016 | Bhutani et al. | |
| 9,283,034 B2 | 3/2016 | Katoh et al. | |
| 9,289,141 B2 | 3/2016 | Lowery et al. | |
| D753,690 S | 4/2016 | Vazquez et al. | |
| 9,320,631 B2 | 4/2016 | Moore et al. | |
| 9,345,540 B2 | 5/2016 | Mallin et al. | |
| D759,673 S | 6/2016 | Looney et al. | |
| D759,675 S | 6/2016 | Looney et al. | |
| D764,500 S | 8/2016 | Wang | |
| D765,709 S | 9/2016 | Gagnier | |
| D767,616 S | 9/2016 | Jones et al. | |
| D768,696 S | 10/2016 | Gagnier | |
| D783,037 S | 4/2017 | Hariharan et al. | |
| 9,655,677 B2 | 5/2017 | Salahieh et al. | |
| D791,805 S | 7/2017 | Segars | |
| 9,795,442 B2 | 10/2017 | Salahieh et al. | |
| D861,717 S | 10/2019 | Brekke et al. | |
| 10,668,258 B1 | 6/2020 | Calhoun et al. | |
| 10,688,278 B2 | 6/2020 | Beeckler et al. | |
| 2001/0031961 A1 | 10/2001 | Hooven | |
| 2002/0002369 A1 | 1/2002 | Hood | |
| 2002/0065455 A1 | 5/2002 | Ben-Haim et al. | |
| 2002/0077627 A1 | 6/2002 | Johnson et al. | |
| 2002/0160134 A1 | 10/2002 | Ogushi et al. | |
| 2003/0018327 A1 | 1/2003 | Truckai et al. | |
| 2003/0050637 A1 | 3/2003 | Maguire et al. | |
| 2003/0060820 A1 | 3/2003 | Maguire et al. | |
| 2003/0120150 A1 | 6/2003 | Govari | |
| 2003/0178032 A1 | 9/2003 | Ingle et al. | |
| 2004/0068178 A1 | 4/2004 | Govari | |
| 2004/0122445 A1 | 6/2004 | Butler et al. | |
| 2004/0225285 A1 | 11/2004 | Gibson | |
| 2005/0059862 A1 | 3/2005 | Phan | |
| 2005/0070887 A1 | 3/2005 | Taimisto et al. | |
| 2005/0119686 A1 | 6/2005 | Clubb | |
| 2006/0013595 A1 | 1/2006 | Trezza et al. | |
| 2006/0135953 A1 | 6/2006 | Kania et al. | |
| 2007/0071792 A1 | 3/2007 | Varner et al. | |
| 2007/0080322 A1 | 4/2007 | Walba | |
| 2007/0083194 A1 | 4/2007 | Kunis et al. | |
| 2007/0276212 A1 | 11/2007 | Fuimaono et al. | |
| 2007/0287994 A1 | 12/2007 | Patel | |
| 2008/0018891 A1 | 1/2008 | Hell et al. | |
| 2008/0021313 A1 | 1/2008 | Eidenschink et al. | |
| 2008/0051707 A1 | 2/2008 | Phan et al. | |
| 2008/0140072 A1 | 6/2008 | Stangenes et al. | |
| 2008/0161797 A1 | 7/2008 | Wang et al. | |
| 2008/0183132 A1 | 7/2008 | Davies et al. | |
| 2008/0188912 A1 | 8/2008 | Stone et al. | |
| 2008/0202637 A1 | 8/2008 | Hector et al. | |
| 2008/0249463 A1 | 10/2008 | Pappone et al. | |
| 2008/0249527 A1 | 10/2008 | Couture | |
| 2008/0262489 A1 | 10/2008 | Steinke | |
| 2009/0163890 A1 | 6/2009 | Clifford et al. | |
| 2009/0171274 A1 | 7/2009 | Harlev et al. | |

(56) References Cited

U.S. PATENT DOCUMENTS

| | | |
|---|---|---|
| 2009/0182318 A1 | 7/2009 | Abboud et al. |
| 2009/0270850 A1 | 10/2009 | Zhou et al. |
| 2010/0069836 A1 | 3/2010 | Satake |
| 2010/0114269 A1 | 5/2010 | Wittenberger et al. |
| 2010/0160906 A1 | 6/2010 | Jarrard |
| 2010/0204560 A1 | 8/2010 | Salahieh et al. |
| 2010/0256629 A1 | 10/2010 | Wylie et al. |
| 2010/0324552 A1 | 12/2010 | Kauphusman et al. |
| 2011/0118632 A1 | 5/2011 | Sinelnikov et al. |
| 2011/0130648 A1 | 6/2011 | Beeckler et al. |
| 2011/0282338 A1 | 11/2011 | Fojtik |
| 2011/0295248 A1 | 12/2011 | Wallace et al. |
| 2011/0301587 A1 | 12/2011 | Deem et al. |
| 2011/0313286 A1 | 12/2011 | Whayne et al. |
| 2012/0019107 A1 | 1/2012 | Gabl et al. |
| 2012/0029511 A1 | 2/2012 | Smith et al. |
| 2012/0065503 A1 | 3/2012 | Rogers et al. |
| 2012/0071870 A1 | 3/2012 | Salahieh et al. |
| 2012/0079427 A1 | 3/2012 | Carmichael et al. |
| 2012/0101413 A1 | 4/2012 | Beetel et al. |
| 2012/0143177 A1 | 6/2012 | Avitall |
| 2012/0191079 A1 | 7/2012 | Moll et al. |
| 2013/0085360 A1 | 4/2013 | Grunewald |
| 2013/0090649 A1 | 4/2013 | Smith et al. |
| 2013/0109982 A1 | 5/2013 | Sato et al. |
| 2013/0150693 A1 | 6/2013 | D'Angelo et al. |
| 2013/0165916 A1 | 6/2013 | Mathur et al. |
| 2013/0165925 A1 | 6/2013 | Mathur et al. |
| 2013/0165941 A1 | 6/2013 | Murphy |
| 2013/0165990 A1* | 6/2013 | Mathur ............. A61N 1/06 607/101 |
| 2013/0184702 A1 | 7/2013 | Neal, II et al. |
| 2013/0261692 A1 | 10/2013 | Cardinal et al. |
| 2013/0274562 A1 | 10/2013 | Ghaffari et al. |
| 2013/0274658 A1 | 10/2013 | Steinke et al. |
| 2013/0282084 A1 | 10/2013 | Mathur et al. |
| 2013/0318439 A1 | 11/2013 | Landis et al. |
| 2014/0018788 A1 | 1/2014 | Engelman et al. |
| 2014/0031813 A1 | 1/2014 | Tellio et al. |
| 2014/0058197 A1 | 2/2014 | Salahieh et al. |
| 2014/0121470 A1 | 5/2014 | Scharf et al. |
| 2014/0148805 A1 | 5/2014 | Stewart et al. |
| 2014/0227437 A1 | 8/2014 | Deboer et al. |
| 2014/0243821 A1 | 8/2014 | Salahieh et al. |
| 2014/0257280 A1 | 9/2014 | Hanson et al. |
| 2014/0276756 A1 | 9/2014 | Hill |
| 2014/0276811 A1 | 9/2014 | Koblish et al. |
| 2014/0288546 A1 | 9/2014 | Sherman et al. |
| 2014/0330266 A1 | 11/2014 | Thompson et al. |
| 2014/0357956 A1 | 12/2014 | Salahieh et al. |
| 2014/0378803 A1 | 12/2014 | Geistert et al. |
| 2015/0005799 A1 | 1/2015 | Lindquist et al. |
| 2015/0018818 A1 | 1/2015 | Willard et al. |
| 2015/0025532 A1 | 1/2015 | Hanson et al. |
| 2015/0025533 A1 | 1/2015 | Groff et al. |
| 2015/0057655 A1 | 2/2015 | Osypka |
| 2015/0067512 A1 | 3/2015 | Roswell |
| 2015/0080883 A1 | 3/2015 | Haverkost et al. |
| 2015/0105774 A1 | 4/2015 | Lindquist et al. |
| 2015/0112256 A1 | 4/2015 | Byrne et al. |
| 2015/0119875 A1 | 4/2015 | Fischell et al. |
| 2015/0119877 A1 | 4/2015 | Jameson et al. |
| 2015/0141982 A1 | 5/2015 | Lee |
| 2015/0157382 A1 | 6/2015 | Avitall et al. |
| 2015/0216591 A1* | 8/2015 | Cao ............. A61B 18/1492 606/41 |
| 2015/0216650 A1 | 8/2015 | Shaltis |
| 2015/0265329 A1 | 9/2015 | Lalonde et al. |
| 2015/0265339 A1 | 9/2015 | Lindquist et al. |
| 2015/0265812 A1 | 9/2015 | Lalonde |
| 2015/0272667 A1 | 10/2015 | Govari et al. |
| 2015/0341752 A1 | 11/2015 | Flynn |
| 2016/0000499 A1 | 1/2016 | Lennox et al. |
| 2016/0051321 A1 | 2/2016 | Salahieh et al. |
| 2016/0085431 A1 | 3/2016 | Kim et al. |
| 2016/0106499 A1 | 4/2016 | Ogata et al. |
| 2016/0166306 A1 | 6/2016 | Pageard |
| 2016/0175041 A1 | 6/2016 | Govari et al. |
| 2016/0183877 A1 | 6/2016 | Williams et al. |
| 2016/0196635 A1 | 7/2016 | Cho et al. |
| 2016/0256305 A1 | 9/2016 | Longo et al. |
| 2016/0374748 A9 | 12/2016 | Salahieh et al. |
| 2017/0042614 A1 | 2/2017 | Salahieh et al. |
| 2017/0042615 A1* | 2/2017 | Salahieh ............. A61B 1/00179 |
| 2017/0080192 A1 | 3/2017 | Giasolli et al. |
| 2017/0143359 A1 | 5/2017 | Nguyen et al. |
| 2017/0164464 A1* | 6/2017 | Weinkam ............. G01K 7/16 |
| 2017/0311829 A1 | 11/2017 | Beeckler et al. |
| 2017/0311893 A1 | 11/2017 | Beeckler et al. |
| 2017/0312022 A1 | 11/2017 | Beeckler et al. |
| 2017/0347896 A1 | 12/2017 | Keyes et al. |
| 2017/0348049 A1 | 12/2017 | Vrba et al. |
| 2017/0354467 A1 | 12/2017 | Rankin et al. |
| 2018/0074693 A1 | 3/2018 | Jones et al. |
| 2018/0092688 A1* | 4/2018 | Tegg ............. A61B 18/18 |
| 2018/0110562 A1* | 4/2018 | Govari ............. A61B 5/065 |
| 2018/0161093 A1 | 6/2018 | Basu et al. |
| 2018/0256247 A1 | 9/2018 | Govari et al. |
| 2018/0333162 A1 | 11/2018 | Saab |
| 2018/0368927 A1 | 12/2018 | Lyons et al. |
| 2019/0117303 A1 | 4/2019 | Claude et al. |
| 2019/0297441 A1 | 9/2019 | Dehe et al. |
| 2019/0298441 A1 | 10/2019 | Clark et al. |
| 2020/0001054 A1 | 1/2020 | Jimenez et al. |
| 2020/0008869 A1 | 1/2020 | Byrd |
| 2020/0015693 A1 | 1/2020 | Beeckler et al. |
| 2020/0085497 A1 | 3/2020 | Zhang et al. |
| 2020/0155226 A1 | 5/2020 | Valls et al. |
| 2021/0169567 A1 | 6/2021 | Govari et al. |

FOREIGN PATENT DOCUMENTS

| | | |
|---|---|---|
| CN | 102106752 A | 6/2011 |
| CN | 102271607 A | 12/2011 |
| CN | 102458566 A | 5/2012 |
| CN | 103118613 A | 5/2013 |
| CN | 203539434 U | 4/2014 |
| CN | 104244856 A | 12/2014 |
| CN | 104546117 A | 4/2015 |
| CN | 104939916 A | 9/2015 |
| CN | 105105844 A | 12/2015 |
| CN | 105473091 A | 4/2016 |
| CN | 105473093 A | 4/2016 |
| CN | 106572842 A | 4/2017 |
| CN | 107970065 A | 5/2018 |
| CN | 108175400 A | 6/2018 |
| EP | 0779059 A1 | 6/1997 |
| EP | 1790304 A2 | 5/2007 |
| EP | 2865350 A2 | 4/2015 |
| EP | 2875790 A2 | 5/2015 |
| EP | 3199118 A1 | 8/2017 |
| EP | 3238646 A2 | 11/2017 |
| EP | 3238648 A1 | 11/2017 |
| EP | 3251622 A1 | 12/2017 |
| EP | 3300680 A1 | 4/2018 |
| EP | 3315087 A1 | 5/2018 |
| EP | 3332727 A2 | 6/2018 |
| EP | 3571983 A2 | 11/2019 |
| EP | 3586778 A1 | 1/2020 |
| EP | 3653153 A1 | 5/2020 |
| JP | H0314121 A | 1/1991 |
| JP | H06261951 A | 9/1994 |
| JP | H1176233 A | 3/1999 |
| JP | H11327735 A | 11/1999 |
| JP | 2000504242 A | 4/2000 |
| JP | 2002336266 A | 11/2002 |
| JP | 2004504314 A | 2/2004 |
| JP | 2005052424 A | 3/2005 |
| JP | 2008538986 A | 11/2008 |
| JP | 2009261609 A | 11/2009 |
| JP | 2010507404 A | 3/2010 |
| JP | 2010088697 A | 4/2010 |
| JP | 2012024156 A | 2/2012 |
| JP | 2012508083 A | 4/2012 |

(56) References Cited

FOREIGN PATENT DOCUMENTS

| | | | |
|---|---|---|---|
| JP | 2013013726 A | 1/2013 | |
| JP | 2013078587 A | 5/2013 | |
| JP | 2013529109 A | 7/2013 | |
| JP | 2014509218 A | 4/2014 | |
| JP | 2014529419 A | 11/2014 | |
| JP | 2015503365 A | 2/2015 | |
| JP | 2015100706 A | 6/2015 | |
| JP | 2015112113 A | 6/2015 | |
| JP | 2015112114 A | 6/2015 | |
| JP | 2015518776 A | 7/2015 | |
| JP | 2016093502 A | 5/2016 | |
| JP | 2016515442 A | 5/2016 | |
| JP | 2016116863 A | 6/2016 | |
| JP | 2016534842 A | 11/2016 | |
| JP | 2017202305 A | 11/2017 | |
| JP | 2017202306 A | 11/2017 | |
| JP | 2018075365 A | 5/2018 | |
| WO | 9605768 A1 | 2/1996 | |
| WO | 0056237 A2 | 9/2000 | |
| WO | 02102231 A2 | 12/2002 | |
| WO | 2005041748 A2 | 5/2005 | |
| WO | 2006055654 A1 | 5/2006 | |
| WO | 2008049087 A2 | 4/2008 | |
| WO | 2011143468 A2 | 11/2011 | |
| WO | 2013049601 A2 | 4/2013 | |
| WO | 2013052919 A2 | 4/2013 | |
| WO | 2013154776 A2 | 10/2013 | |
| WO | 2014123983 A2 | 8/2014 | |
| WO | 2014168987 A1 | 10/2014 | |
| WO | 2015049784 A1 | 4/2015 | |
| WO | 2015200518 A1 | 12/2015 | |
| WO | 2016084215 A1 | 6/2016 | |
| WO | 2016183337 A2 | 11/2016 | |
| WO | 2016210437 A1 | 12/2016 | |
| WO | 2017024306 A1 | 2/2017 | |
| WO | 2017087549 A1 | 5/2017 | |
| WO | 2017163400 A1 | 9/2017 | |
| WO | 2018106569 A1 | 6/2018 | |
| WO | 2019095020 A1 | 5/2019 | |

OTHER PUBLICATIONS

Extended European Search Report for Application No. EP17168513.4 mailed on Sep. 18, 2017, 11 pages.
Extended European Search Report for European Application No. 17201434.2, mailed on Feb. 1, 2018, 9 pages.
Extended European Search Report for European Application No. EP15201723.2, mailed on May 11, 2016, 7 pages.
Extended European Search Report for European Application No. EP17168518.3, mailed on Sep. 20, 2017, 9 pages.
Extended European Search Report for European Application No. EP17173893.3, mailed on Nov. 6, 2017, 8 pages.
Extended European Search Report for European Application No. EP17205876.0, mailed on Jun. 1, 2018, 13 pages.
Extended European Search Report for European Application No. EP20153872.5, mailed on May 7, 2020, 8 pages.
International Search Report and Written Opinion for Application No. PCT/IB2019/056381, mailed on Dec. 17, 2019, 10 pages.
International Search Report and Written Opinion for Application No. PCT/IB2019/052313, mailed on Jul. 22, 2019, 08 pages.
Partial European Search Report for Application No. EP17168393.1 mailed on Sep. 13, 2017, 13 pages.
Partial European Search Report for European Application No. EP17205876.0, mailed on Feb. 22, 2018, 10 pages.
European Search Report for European Application No. 19183327, mailed on Nov. 21, 2019, 8 pages.
YouTube, "Intensity™ CX4 Professional E-Stim/Ultrasound Combo", Dec. 22, 2015, Retrieved from internet [https://www.youtube.com/watch?v=76s1QKMWJME], retrieved on Nov. 19, 2020, 1 page.
YouTube, "New Interface TactiCath Contact Force Ablation Catheter", Nov. 26, 2013, retrieved from internet [https://www.youtube.com/watch?v=aYvYO8Hpylg], retrieved on Nov. 19, 2020, 1 page.
Copending U.S. Appl. No. 15/452,843, filed Mar. 8, 2017, 24 pages.
Copending U.S. Appl. No. 16/036,710, filed Jul. 16, 2018, 35 pages.
Extended European Search Report for European Application No. EP20195648.9, mailed on Feb. 12, 2021, 8 pages.
Extended European Search Report for European Application No. EP19177365.4, mailed on Nov. 8, 2019, 7 pages.
Haines, D.E., et al., "The Promise of Pulsed Field Ablation," Dec. 2019, vol. 19 (12), p. 10.
Compounding Solutions, "PEBA RO Compounds", Nov. 17, 2017 (Year: 2017), 1 page.
Demetrius Lopes, Balloon Design and Performance: Presentation of various types of balloons on the market. Attached. Also available at: https://www.neurovascularexchange.com/media/slides/210/balloon-design-and-performance-presentation-of-various-types-of-balloons-on-the-market.pdf, 80 pages.
Foster, "Foster Corporation Introduces Newest ProPell™ "T" Translucent Compounds", Sep. 13, 2018 (Year: 2018), 3 pages.
Foster, "Foster ProPell™ "T" Low Friction Compounds", 2018 (Year: 2018), 2 pages.
Medtronic, Hyper Occlusion Balloon Portfolio. Attached. Also Available at: https://www.linnc.com/content/download/125103/2591577/version/1/file/Hyper+Balloon+Brochure+LR.pdf, 3 pages.

* cited by examiner

FLEXIBLE-CIRCUIT TIP FOR A SPLIT-TIP CATHETER

CROSS-REFERENCE TO RELATED APPLICATION

The present application claims priority under 35 U.S.C. § 119 to U.S. Provisional Patent Application No. 62/711,708, filed Jul. 30, 2018, the entire contents of this application is incorporated by reference herein in its entirety.

FIELD

The subject matter disclosed relates to electrophysiology catheters and more particularly to a flexible-circuit tip for a split-tip catheter for use in electrocardiology ablation and mapping procedures.

BACKGROUND

Cardiac arrhythmias, such as atrial fibrillation, occur when regions of cardiac tissue abnormally conduct electric signals to adjacent tissue, thereby disrupting the normal cardiac cycle and causing asynchronous rhythm.

Procedures for treating arrhythmia include surgically disrupting the origin of the signals causing the arrhythmia, as well as disrupting the conducting pathway for such signals. By selectively ablating cardiac tissue by application of energy via a catheter, it is sometimes possible to block or modify the propagation of unwanted electrical signals from one portion of the heart to another. The ablation process destroys the unwanted electrical pathways by formation of non-conducting lesions.

SUMMARY OF THE DISCLOSURE

Ablation, particularly of cardiac tissue, depends upon accurate delivery of ablative energy while avoiding negative side effects caused by providing ablative energy to blood such as thrombus formation. A catheter having a tip divided into three segments directed to these purposes is disclosed. The tip may be a fabricated as a planar flexible circuit, e.g., via lithography, as having a first planar segment and a second planar segment. The second planar segment may comprise a plurality of irrigation ports disposed therethrough. The second planar segment may also comprise a first layer including a substrate, a second layer including at least a first temperature sensor, a second temperature sensor, and a conductor element, and a third layer including an insulator (e.g., a polyamide, polyimide, or polyurethane material). Additionally, the second planar segment may include a first sector and a second sector, the first sector having the first temperature sensor and the second temperature sensor, and the second sector having a third temperature sensor and a fourth temperature sensor. The second planar segment may also include a third sector, the third sector having a fifth temperature sensor and a sixth temperature sensor. In any of these embodiments, the conductor element may include a trace connected to an ablation electrode. Additionally, the first sector, the second sector, and the third sector may each include a respective solder pad having a first contact operatively coupled to a respective thermocouple, a second contact operatively coupled to another respective thermocouple, and a third contact operatively coupled to a respective electrode.

Also in any of these embodiments, the first planar segment may include a first-segment substrate and a first-segment insulator. Further, the first planar segment may include a first-segment temperature sensor. It may also include a first-segment electrode. A first space may be provided between the second layer of the first sector and the second layer of the second sector, and a second space may be provided between the second layer of the second sector and the second layer of the third sector. A first insulation material may be disposed within the first space, and alternatively or additionally within the second space. The first insulation material may be a suitable insulation material such as, for example, bio-compatible ceramics or a high-temperature epoxy.

The tip, in any of the foregoing embodiments, may be included on a distal end of a catheter. The catheter may also include an elongate body having at least two lumens disposed longitudinally therethrough. A core may be attached to the distal end of the catheter, at least a portion of which may be disposed within the second segment of the tip. The core may comprise an insulative material, such as polyurethane. Further, the core may include a lumen oriented transverse to a longitudinal axis of the core. A second insulation material may be disposed between the second segment and the core. The core may be in communication with a first one of the at least two lumens of the catheter body such that fluid may flow through one of the lumens and through the core. A plurality of wires may be disposed within at least a second one of the at least two lumens and this plurality of wires may be electrically connected to the flexible-circuit tip.

The catheter may be assembled by first receiving the catheter body and the tip in a planar configuration, as fabricated. The tip may have its planar configuration changed to a non-planar configuration (e.g., cylindrical configuration) by bending the tip as such and then connecting it to the distal end of the catheter body. In those embodiments that include a core, the core may be received and then attached to the distal end of the catheter body. The core may then be disposed within the tip in the cylindrical configuration, and then attached to the tip.

The catheter may be used according to the following method and variations. First, the catheter be inserted into a subject, e.g., a human subject, proximate to the subject's heart. The tip may be maneuvered into contact with the tissue. The catheter ay be an aspect of an ablation system that also includes a processor that is in communication with the tip. The first sector may monitor an ECG signal and provide the signal to the processor. The second sector may monitor an ECG signal and provide the signal to the processor. The third sector may monitor an ECG signal and provide the signal to the processor. Each of the three sectors may also measure temperature and provide temperature data to the processor. Ablation energy may be provided to the tip, e.g., as controlled by processor.

In some variations of the method, the processor determines that the first tip sector contracts tissue. Further, the processor may determine that the second tip sector contacts tissue. Further, the processor may determine that the third tip sector contacts tissue.

The processor may control ablation energy to the first tip sector while receiving ECG signals from the second tip sector at the processor. Such may also be performed while the processor receives ECG signals from the third tip sector at the processor. The processor may control ablation energy to the second tip sector while receiving ECG signals from the third tip sector. Such may also be performed while the processor receives ECG signals from the first tip sector. The processor may control ablation energy to the third tip sector while receiving ECG signals from the first tip sector at the processor. Such may also be performed while the processor receives ECG signals from the second tip sector. Additionally or alternatively, the processor may control ablation energy simultaneously to at least two of the first, second, and third tip sectors.

In any of these variations, a portion of tissue in contact with the first tip sector may be ablated. Then, without moving the tip a portion, tissue in contact with the second tip sector may be ablated.

As used herein, the terms "insulator," "insulation material," "insulative material," and the like, each connote materials and structures comprising at least one material that has properties, generally accepted by those of skill in the art, to resist transfer of heat and conveyance of electrical signals. Such materials include, but are not limited to, polyamide, polyimide, polyurethane, polycarbonate, ceramic, liquid crystal polymer, and high-temperature epoxy.

BRIEF DESCRIPTION OF THE DRAWINGS

While the specification concludes with claims, which particularly point out and distinctly claim the subject matter described herein, it is believed the subject matter will be better understood from the following description of certain examples taken in conjunction with the accompanying drawings, in which like reference numerals identify the same elements and in which:

MODES OF CARRYING OUT THE INVENTION

The following detailed description should be read with reference to the drawings, in which like elements in different drawings are identically numbered. The drawings, which are not necessarily to scale, depict selected embodiments and are not intended to limit the scope of the invention. The detailed description illustrates by way of example, not by way of limitation, the principles of the invention. This description will clearly enable one skilled in the art to make and use the invention, and describes several embodiments, adaptations, variations, alternatives and uses of the invention, including what is presently believed to be the best mode of carrying out the invention.

As used herein, the terms "about" or "approximately" for any numerical values or ranges indicate a suitable dimensional tolerance that allows the part or collection of components to function for its intended purpose as described herein. More specifically, "about" or "approximately" may refer to the range of values±10% of the recited value, e.g. "about 90%" may refer to the range of values from 81% to 99%. In addition, as used herein, the terms "patient," "host," "user," and "subject" refer to any human or animal subject and are not intended to limit the systems or methods to human use, although use of the subject invention in a human patient represents a preferred embodiment.

Figure 1:
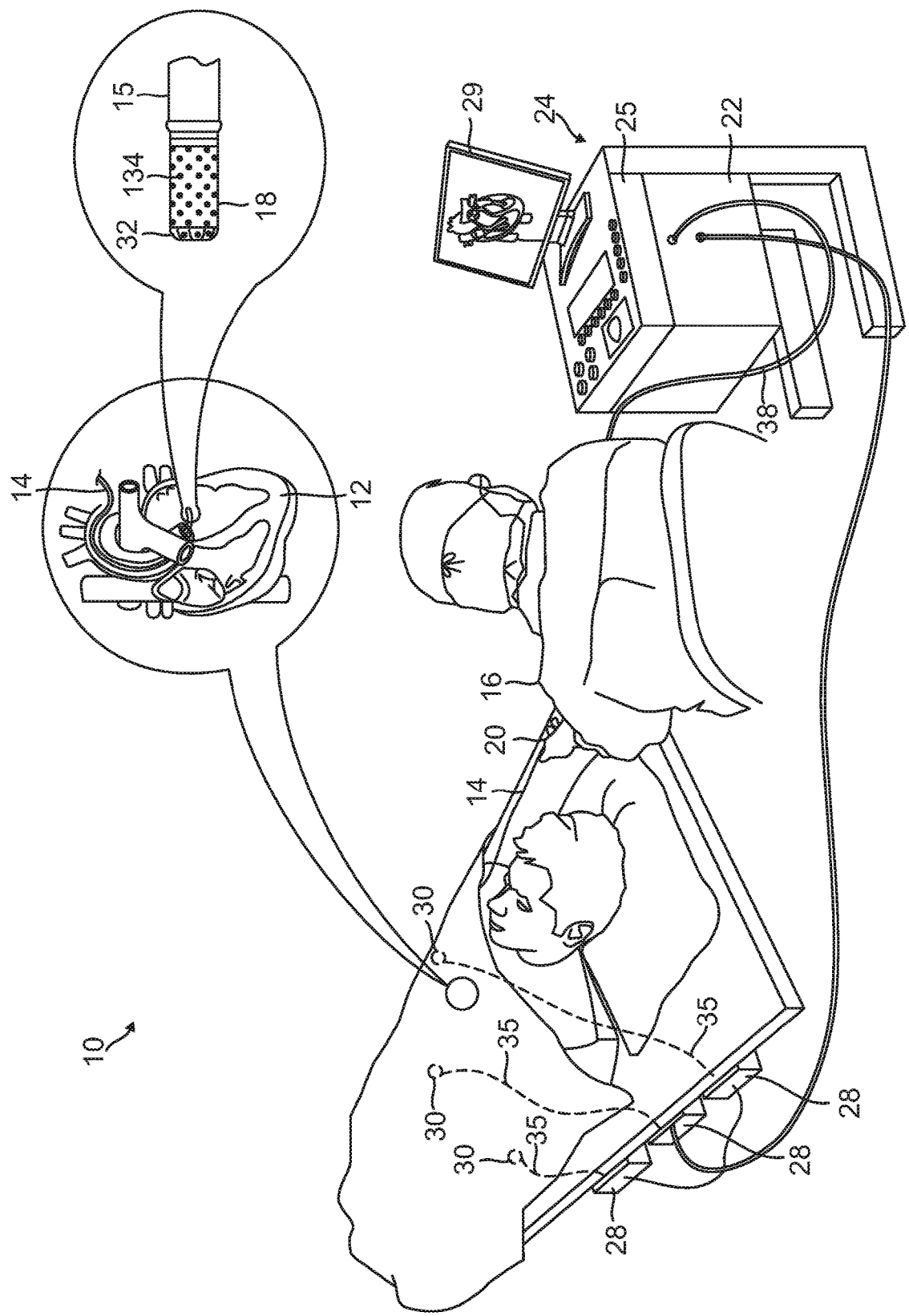
FIG. 1 is a pictorial illustration of a system for evaluating electrical activity in a heart of a living subject and providing treatment thereto using a catheter.

FIG. 1 is a pictorial illustration of a system 10 for evaluating electrical activity and performing ablative procedures on a heart 12 of a living subject. The system includes a diagnostic/therapeutic catheter having a catheter body 14 having a distal end 15 and a tip, e.g., tip 18 disposed thereon, which may be percutaneously inserted by an operator 16 through the patient's vascular system into a chamber or vascular structure of the heart 12. The operator 16, who is typically a physician, brings the catheter's tip 18 into contact with the heart wall, for example, at an ablation target site. Electrical activation maps may be prepared, according to the methods disclosed in U.S. Pat. Nos. 6,226,542, and 6,301,496, and in commonly assigned U.S. Pat. No. 6,892,091, whose disclosures are herein incorporated by reference in their entirety. One commercial product embodying elements of system 10 is available as the CARTO® 3 System, available from Biosense Webster, Inc., 33 Technology Drive, Irvine, CA 92618.

Areas determined to be abnormal, for example by evaluation of the electrical activation maps, can be ablated by application of thermal energy, e.g., by passage of radiofrequency electrical current through wires in the catheter to one or more electrodes at the tip 18, which apply the radiofrequency energy to target tissue. The energy is absorbed in the tissue, heating it to a point (typically above 50° C.) at which point it permanently loses its electrical excitability. This procedure creates non-conducting lesions in the cardiac tissue, which disrupt the abnormal electrical pathway causing the arrhythmia. Such principles can be applied to different heart chambers to diagnose and treat many different types of cardiac arrhythmias.

The catheter typically includes a handle 20, having suitable controls on the handle to enable the operator 16 to steer, position and orient the distal end 15 of the catheter as desired for the ablation.

Ablation energy and electrical signals can be conveyed to and from the heart 12 through one or more electrodes 32 located at or near the tip 18, or comprising tip 18, via cable 38 to the console 24. Pacing signals and other control signals may be conveyed from the console 24 through the cable 38 and the electrodes 32 to the heart 12.

Wire connections 35 link the console 24 with body surface electrodes 30 and other components of a positioning sub-system for measuring location and orientation coordinates of the catheter. The processor 22 or another processor may be an element of the positioning subsystem. The electrodes 32 and the body surface electrodes 30 may be used to measure tissue impedance at the ablation site as taught in U.S. Pat. No. 7,536,218, issued to Govari et al., which is herein incorporated by reference in its entirety. At least one temperature sensor, typically a thermocouple or thermistor, may be included on or near each of the electrodes 32, as will be detailed below.

The console 24 typically contains one or more ablation power generators 25. The catheter may be adapted to conduct ablative energy to the heart using any known ablation technique, e.g., radiofrequency energy, ultrasound energy, cryogenic energy, and laser-produced light energy. Such methods are disclosed in commonly assigned U.S. Pat. Nos.

6,814,733, 6,997,924, and 7,156,816, which are herein incorporated by reference in their entirety.

The positioning subsystem may also include a magnetic position tracking arrangement that determines the position and orientation of the catheter by generating magnetic fields in a predefined working volume and sensing these fields at the catheter, using coils or traces disposed within the catheter, typically proximate to the tip. A positioning subsystem is described in U.S. Pat. No. 7,756,576, which is hereby incorporated by reference in its entirety, and in the above-noted U.S. Pat. No. 7,536,218.

Operator 16 may observe and regulate the functions of the catheter via console 24. Console 24 includes a processor, preferably a computer with appropriate signal processing circuits. The processor is coupled to drive a monitor 29. The signal processing circuits typically receive, amplify, filter and digitize signals from the catheter, including signals generated by sensors, e.g., electrodes 32, such as electrical and temperature sensors, and a plurality of location sensing coils or traces located distally in the catheter. The digitized signals are received and used by the console 24 and the positioning system to compute the position and orientation of the catheter, and to analyze the electrical signals received from the catheter.

Figure 2:
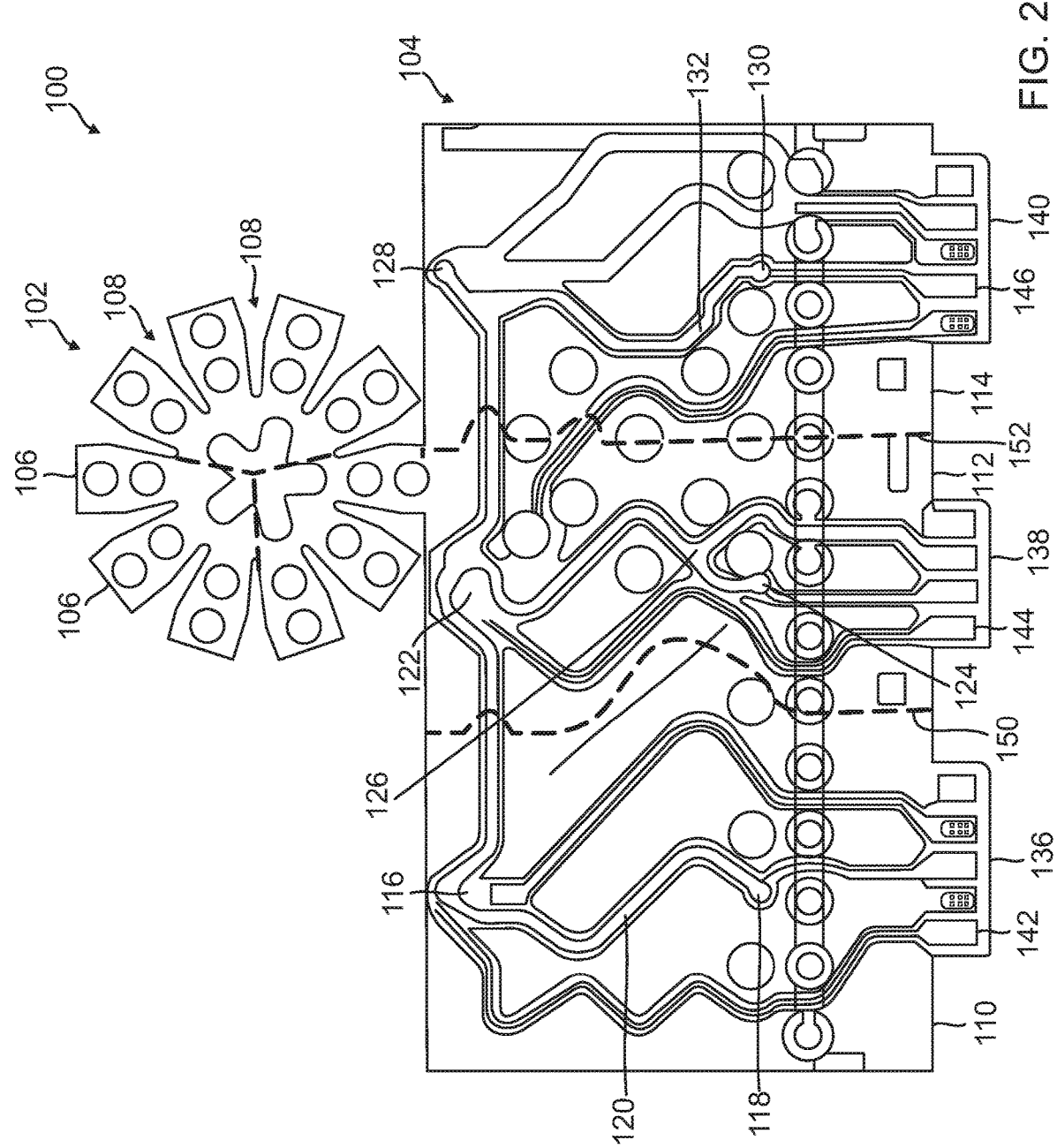
FIG. 2 depicts a flexible circuit.

The subject matter disclosed herein concerns improvements to fabrication and functionality of catheter tips known in the art, such as that disclosed in U.S. Pat. No. 6,171,275 to Webster, which is incorporated herein by reference in its entirety. The improved catheter tip may be fabricated via a lithographic process as a planar flexible circuit 100 reflected in FIG. 2. The flexible circuit 100 is, as its description suggests, flexible. Accordingly, it may be bent into various non-planar configurations. For example, the configuration may be changed from planar to cylindrical, such that flexible circuit 100 may be changed into a cylindrical flexible-circuit tip 200, reflected in FIG. 3. Accordingly, apart from the planar configuration of flexible circuit 100 and the non-planar configuration of flexible-circuit tip 200, it should be understood that features described herein with respect to flexible circuit 100 are also present in flexible-circuit tip 200 and, similarly, features described herein with respect to flexible-circuit tip 200 are also present in flexible circuit 100, even if express disclosure is not made concerning one of these configurations. Further, the surface of flexible circuit 100 visible in FIG. 2 becomes the inner surface of flexible-circuit tip 200, and thus the electronic componentry visible in FIG. 2 is not visible in FIG. 3

Flexible circuit 100 may include various segments depending on the desired structure of the flexible-circuit tip into which it will be formed. As seen in FIG. 2, flexible circuit 100 has two segments, i.e., a first segment 102 and a second segment 104. First segment 102 may have a circular shape and second segment 104 may have a rectangular shape. So comprised, flexible circuit 100 may be formed into the cylindrical flexible-circuit tip 200 reflected in FIG. 3, with first segment 102 becoming the distal-most portion (base of the cylinder) 202 of tip 200, and with segment 104 becoming a lateral surface (wall of the cylinder) 204 of tip 200.

First segment 102 may be provided as having a geared or floral pattern comprising teeth or petals 106. Spaces 108 between teeth 106 may accommodate a transition zone 203 between base 202 and wall 204. Holes may further be provided through first segment 102, such that holes 208 would be disposed within transition zone 203. Holes 208 may accommodate various electronic components of the catheter, e.g., electrodes 32. Additional electronic components may be incorporated into first segment 102, such as a temperature sensor (e.g., a thermocouple), described below.

Second segment 104 may include at least two, e.g., three, sections or sectors, such as first sector 110, second sector 112, and third sector 114. Dotted lines are provided on second segment 104 demarcating boundaries between these sectors. Dotted lines are also provided on first segment 102 demarcating portions that align with sectors 110, 112, and 114 in flexible-circuit tip 200.

First sector 110 may include two temperature sensors (e.g., thermocouples) 116 and 118, and a conductor element 120. Second sector 112 a include two temperature sensors 122 and 124, and a conductor element 126. Third sector 112 may include two temperature sensors 128 and 130, and a conductor element 132. Conductor elements 120, 126, and 132 may each comprise at least a trace. Alternatively or additionally, conductor elements 120, 126, and 132 may additionally comprise or be connected to an electrode, which may be, for example, conductive portions of first, second, and third sectors 110, 112, and 114, particularly the outer layer of second segment 104 that becomes the outer surface of tip 200. In such embodiments, vias should be provided between conductor elements 120, 126, and 132 and the outer layer. Alternatively or additionally conductor elements 120, 126, and 132 may be connected to an electrode (e.g., electrodes 32) The electrodes (whether the outer surface of tip 200 or electrodes 32) may function as, e.g., ablation electrodes, mapping electrodes, or a combination thereof depending on whether they receive signals from generators 25 or detect electric signals from tissue that they may provide to processor 22.

Flexible circuit 100 may further comprise various layers, e.g., formed via a lithographic process. At least one layer may be an electrically conductive material, e.g., gold, platinum, or palladium, or a combination thereof. For example, the layer that forms the outer surface seen in FIG. 3 on flexible-circuit tip 200, may be formed of electrically conductive material. Additionally, another layer that includes at least some of the electronic componentry of FIG. 2 (e.g., temperature sensors 116 and 118) may also be formed of electrically conductive material. Another layer may comprise a substrate, e.g., a thin film of a non-conductive or insulation material, onto which conductive material may be deposited. An additional layer may also comprise an insulator. The substrate layer and the insulating layer are similar, and may be provided as a single layer, however, improved insulation properties may be achieved by providing a layer that has the sole purpose of insulating heat and electronic signals from one portion of tip 200 to other portions of tip 200, as described below.

Ports 134 may be provided through flexible circuit 100. These ports may be used to provide irrigation out of tip 200. Solder pads 136, 138 and 140 may also be provided on second segment 104, i.e., solder pad 136 on first sector 110, solder pad 138 on second sector 112, and solder pad 140 on third sector 114, each having various contacts 142, 144, and 146 that are in conductive communication (operatively coupled) with the electronic componentry disposed on the corresponding sector. That is, for example, solder pad 136 includes various contacts that are operatively coupled to thermocouples 116 and 118, and conductor element 120. In this manner, the electronic componentry on one of the three sectors of second segment 104 may be controlled (e.g., for providing ablation or detecting electronic signals from tissue) and monitored separately (e.g., detecting separate temperatures for the separate temperature sensors disposed on each section of segment 104) from the electronic componentry on the other two sectors of second segment 104. Further, temperatures may be precisely monitored about tip 200 because each of the three sectors includes two distinct temperature sensors, for a total of six temperature sensors on tip 200.

In further embodiments, spacing may be provided between first sector 110 and second sector 112 as well as between second sector 112 and third sector 114. The spacing may be provided through each layer, i.e., through the entire thickness of flexible circuit 100. However, this spacing may be provided through only the layers comprising conductive materials and need not be provided in the substrate and insulating layers comprising non-conductive materials. This spacing may, for example, be provided along the contours identified by the dotted lines 150 and 152 in FIG. 2. The spacing segregates the various sectors 110, 112, and 114 from each other, for example, helping prevent distribution of heat from one sector to the other. Accordingly, insulative materials may be disposed within the spacing.

Flexible circuit 100 may be formed into flexible-circuit tip 200 and connected to distal end 15 of catheter body 14. Catheter body may have disposed longitudinally therethrough at least two lumens. For example, one of the two lumens may be used to conduct irrigation fluid through catheter body and into tip 200. The other one of the two lumens may contain lead wires for conveying signals, e.g., electrical signals, to and from the electronic componentry of tip 200. Additional lumens may be provided to, e.g., enable steering functionality, such as by including puller wires, or for a guide wire, as is known in the art.

Figure 3:
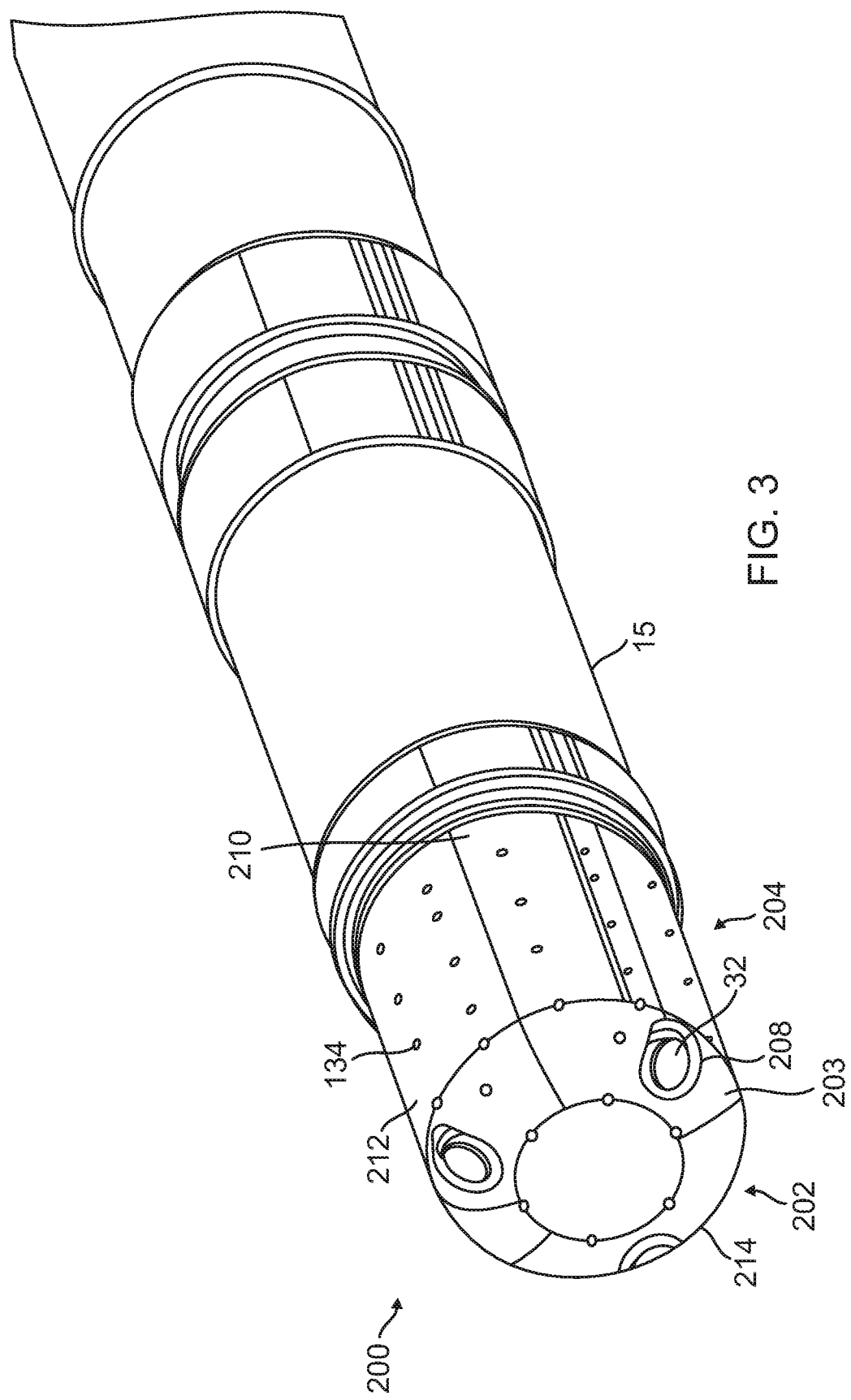
FIG. 3 depicts the flexible circuit of FIG. 2 formed into a flexible-circuit tip and connected to a distal end of a catheter.
Figure 4:
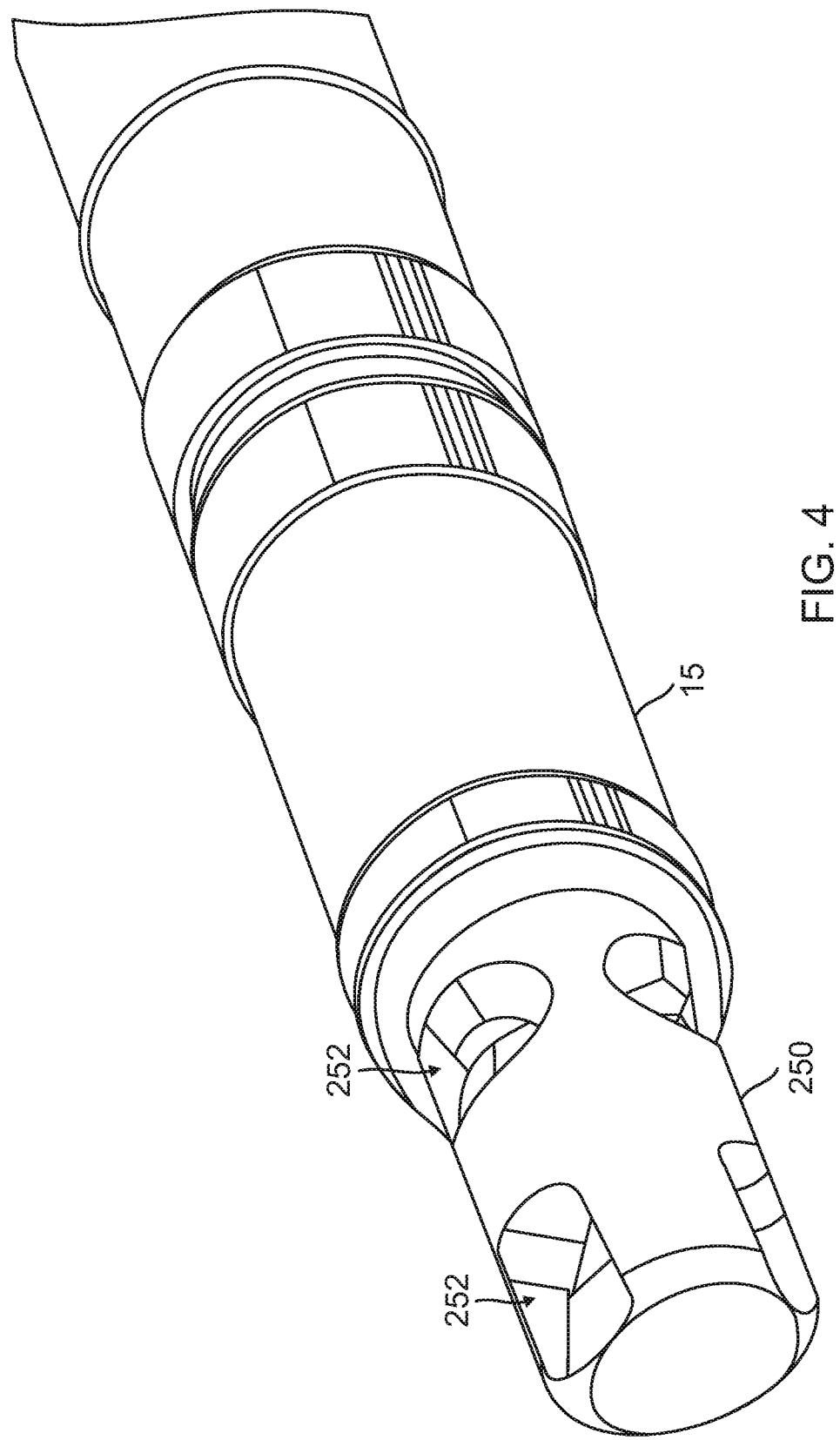
FIG. 4 is a representation of FIG. 3, with the flexible-circuit tip hidden.

Referring to FIG. 4, which is a representation of FIG. 3 with tip 200 hidden, a core 250 may be attached to distal end 15 of catheter body 14. Core 250 may be disposed within tip 200 and attached thereto such that tip 200 may be connected to distal end 15 via or with the assistance of core 250. Core 250 may include various ports 252 therethrough such that when core 250 is connected to catheter body 14, ports 252 are in fluid communication with the irrigation lumen of catheter body 14. Core 250 may provide the following advantages. First, it may prevent irrigation fluid from entering an interior of tip 200 in a longitudinal direction, which could bias irrigation flow out of irrigation holes. Core 250 instead equalizes the flow distribution by diverting the flow into various streams symmetric to each other and transverse to the core. Second, core 250 may comprise an insulative material, e.g., polycarbonate, which may further assist in preventing heat distribution between the three sectors 210, 212, and 214 of wall 204 (corresponding to the three sectors 110, 112, and 114 of second segment 104 of flexible circuit 100). In this regard, further insulation material may be disposed within a space between core 250 and tip 200, e.g., a high temperature epoxy, polyurethane, polyamide, or polyimide. Third, a portion of core 250 may function as a mandrel about which flexible circuit 100 may be formed into flexible-circuit tip 200.

Figure 5:
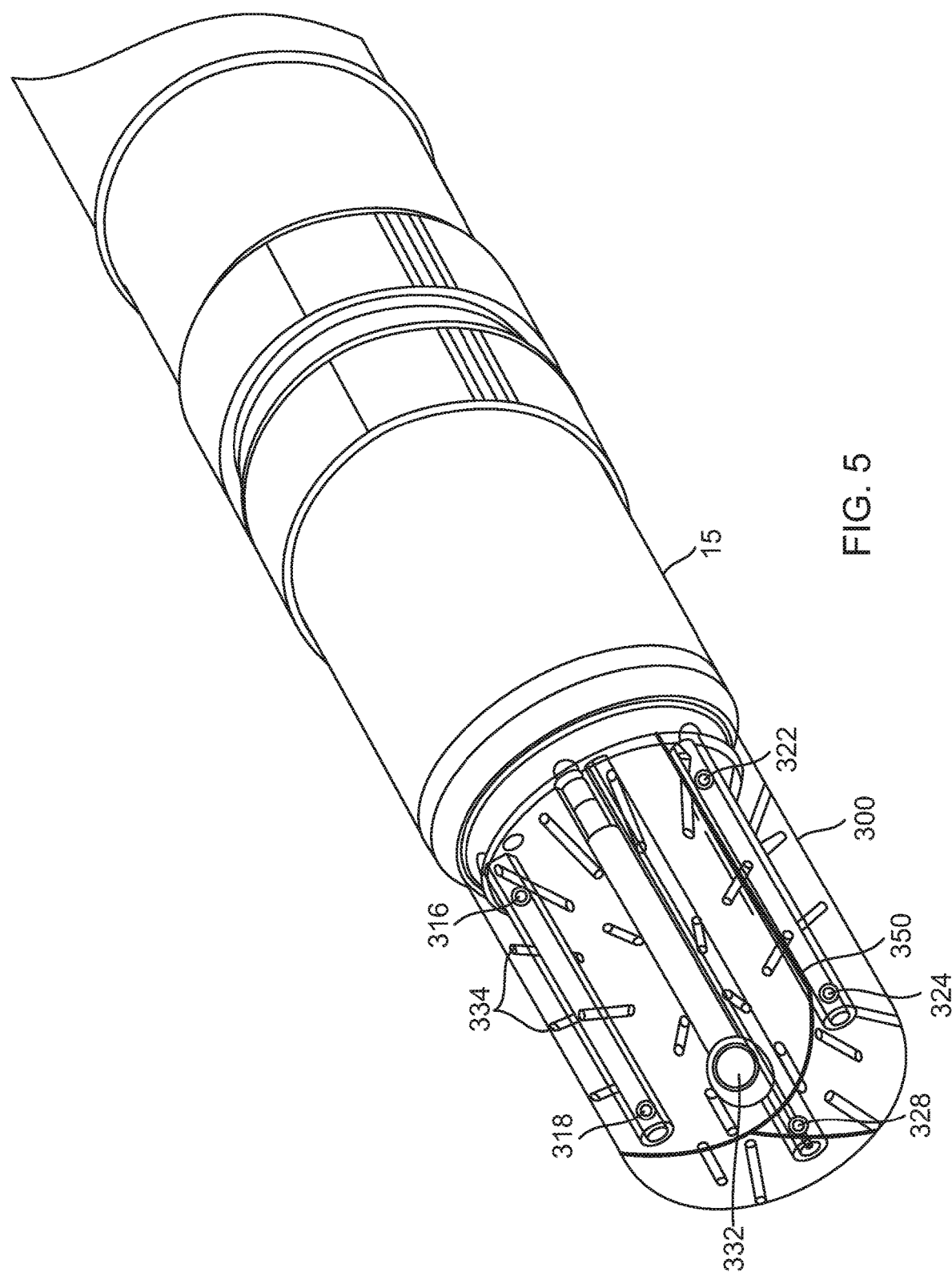
FIG. 5 depicts an alternative embodiment of a catheter including a flexible-circuit tip.

This third advantage may be perceived in FIG. 5, which shows an alternative embodiment in which flexible-circuit tip 300 is transparent (except that reference lines are provided to distinguish sectors 310, 312, and 314 from each other). Core 350 is shown therein, also transparent, but with various irrigation ports indicated therethrough. Core 350 thus takes up the entire or most of the entire interior space defined by flexible-circuit tip 300. Thus, in this embodiment, flexible circuit 100 may be molded or conformed to the exterior shape of core 350. Further, it may be bonded thereto, which may facilitate assembly to catheter body 14. Various tubes, e.g., 360, 362, and 364 may also be provided within core 350 to enable couplings to temperature sensors 316, 318, 322, 324, 328, and 330. Additional tubes, e.g., 366 may also be provided within the core to enable couplings to other electronic component r, e.g., electrode 332. In various embodiments, core 250 and 350 need not include any lumens therethrough such that it might not provide the flow diversion functionality described above.

Upon forming flexible circuit 100 into flexible-circuit tip 200 (or 300), a space may be formed between first sector 210 (or 310) and third sector 214 (or 314). This space may be filled with an insulating material, as explained above for the spaces between first sector 110 and second sector 112 and between second sector 112 and third portion 114.

Catheter body 14, outfitted with tip 200 (or 300) thus provides various improvements in catheter tip design. Notably, each sector 210, 212, and 214 and the electronic componentry thereof is insulated from and functionally independent from the other two sectors. Such assists system 10 to measure and generate information that system 10 or operator 16 may use to provide and modify ablation therapy. In the preferred embodiment, the tip is divided into three or more unique sectors, each having distinct electrodes. The electrodes on one of the sectors can be activated or deactivated separately from the electrodes on each of the other sectors, and they can be activated to provide different functionality, e.g., ablation or ECG sensing. Further, the electrical signals, typically in the RF range of the generator, provided to each of the three sectors may be the same or different than the electrical signals provided to one or both of the others. That is, the power delivered to each tip sector (e.g., power amount denoted in Watts) can be the same or different for each of the sectors. For example, the power amount delivered to the first tip sector ("first power amount" in Watts) can be controlled to be different (i.e., higher or lower) than the power amount delivered to the second tip sector ("second power amount"). As well, the third tip sector can be turned off or a third power amount can be provided to the third tip sector ("third power amount") that is different from the first power amount or the second power amount. Alternatively, energy delivered (in Joules) to each sector can be the same or different for each sector. In yet another example, the frequency of the RF signals provided to one sector may be varied relative to the frequency of the signals provided to one sector or both other sectors. The RE signals may be varied to any frequency within the RF frequency band of 10 kHZ to 1 MHz, e.g., based on suitable feedback controls. Such techniques to control energy or power to the tip sectors assist in controlling the temperature of tip 200 or tissue being ablated, and may further assist in improving the precision of the ablation.

It is noted that the make-up of biological tissue (e.g., water content, thickness or other tissue characteristics) in contact with a tip sector can affect the resistivity and therefore the RF power being delivered by that tip sector to the tissue. As such, the amount of temperature rises in that tip sector due to the energy or power delivered to such tissue can be different from other tip sectors in contact with the same tissue at different locations with correspondingly different tissues characteristics (or even different tissues). Therefore, one advantage of the embodiments herein is the ability for the system deliver different power levels to different tip sectors to ensure that the temperature measured for one tip sector is generally the same for all of the tip sectors.

Tip 200 (or 300) may be brought into contact with tissue such that the tissue contacts at least a portion of the first sector, or at least a portion of the first sector and at least a portion of a second sector, or at least a portion of each of the three sectors. ECG signals may be separately assessed by the various electrodes of the three sectors such that the user or the system can determine which sectors contact tissue to determine which electrodes to activate to ablate. Further, the sector-specific signals of ECG may be used to tailor the therapy. For example, while sector 210, operating as an ablation electrode, provides ablation energy to tissue that sector 210 (or at least a portion thereof) contacts, the temperature sensors on sector 210 measure and provide temperature data to processor 22. Simultaneously, some or all of the temperature sensors on tip 200 may provide temperature data to processor 2, while sectors 212 and 214, operating as electromagnetic sensors and not in contact with tissue, in partial contact with tissue, or in full contact with tissue, may provide ECG data to processor 22 or may be deactivated. Alternatively, one of sectors 212 or 214 may be deactivated while the other provides ECG data. That is, while one or two sectors' electrodes function as ablation electrodes, the other electrodes can provide input to determine if additional areas should be ablated, and if so, how the therapy should be provided or tailored (e.g., via power modification, duration of activation, continuous or pulsed activations, etc.). Further, by providing ablation energy only to those sectors in contact with tissue, ablation energy may be precisely provided directly to tissue such that energy applied to blood may be minimized, which minimizes the likelihood of thrombus formation. In addition, with a smaller area of the anatomy (e.g., epicardial or renal) directly receiving the energy, there will be a higher probability that the errant tissue will be ablated faster and more accurately. Further, the ECG data from non-tissue contacting sector(s) may be used to check for early signs of blockages (e.g., thrombi), while tissue-contacting sector(s) in contact with tissue are being ablated, such that remedial steps may be promptly taken.

Additionally, in certain instances, e.g., when at least a portion of all three sectors is determined to be in contact with tissue, processor 22 may control the application of ablation energy, either automatically or based on user input, such that the ablation energy may be provided to tissue via all three sectors simultaneously or in succession. When the ablation energy is applied in succession to more than one electrode, the ablation electrodes may be activated one at a time or two at a time. Two exemplary in-succession activations include: 1) sector 210 may be activated then deactivate, then sector 212 may be activated then deactivated, and sector 214 may be activated then deactivated; and 2) sectors 210 and 212 may be activated, then sector 210 may be deactivated and sector 214 activated, then sector 212 may be deactivated and sector 210 activated. Additional in-succession activations in differing combinations may be performed and also repeated until the desired ablation is achieved, as indicated by ECG signals or other signals provided by the electrode. One advantage of in-succession activations is that it permits different portions of tissue to be ablated and monitored without moving the catheter. Further, in-succession activations may be combined with simultaneous activations of all of the sectors. Moreover, the activations, whether in sequence or simultaneous, may be performed repeatedly.

In some epicardial applications, certain design considerations may suggest further minimizing heat generated by one sector from being detected by a thermocouple of another sector, and further minimizing the likelihood that ECG signals detected by an electrode on one sector are also detected by a sensor of another sector. Accordingly, one or two of the three sectors may be fabricated with greater insulation properties but without other functions, such as temperature measurement, ablation, and sensing, and associated componentry, such as thermocouples and electrodes. Accordingly, one or two of the sectors, e.g., sector 212, sector 214, or both, may have a greater amount of insulation material incorporated therein than in those embodiments where these sectors include functions of, e.g., ablation. Thus, for example, a ceramic material may be deposited onto flexible circuit 100 over sectors 112 and 114, which assists in preventing heat from ablated tissue from affecting the catheter tip via these sectors.

As noted above, ECG signals may be separately assessed by electrodes disposed on the tip such that the user or the system can determine that the tip contacts tissue, and, in those embodiments with electrodes on different tip sectors, to determine which electrodes to activate for providing ablation therapy. Contact with tissue may also be determined using force contact sensors, e.g., as described in U.S. patent application Ser. No. 15/452,843, filed Mar. 8, 2017, which is incorporated by reference herein in its entirety. A contact force sensor particularly suited for use in a catheter having a split tip is now described, and also described in U.S. patent application Ser. No. 16/036,710, filed Jul. 16, 2018, and incorporated by reference herein in its entirety.

Figure 6:
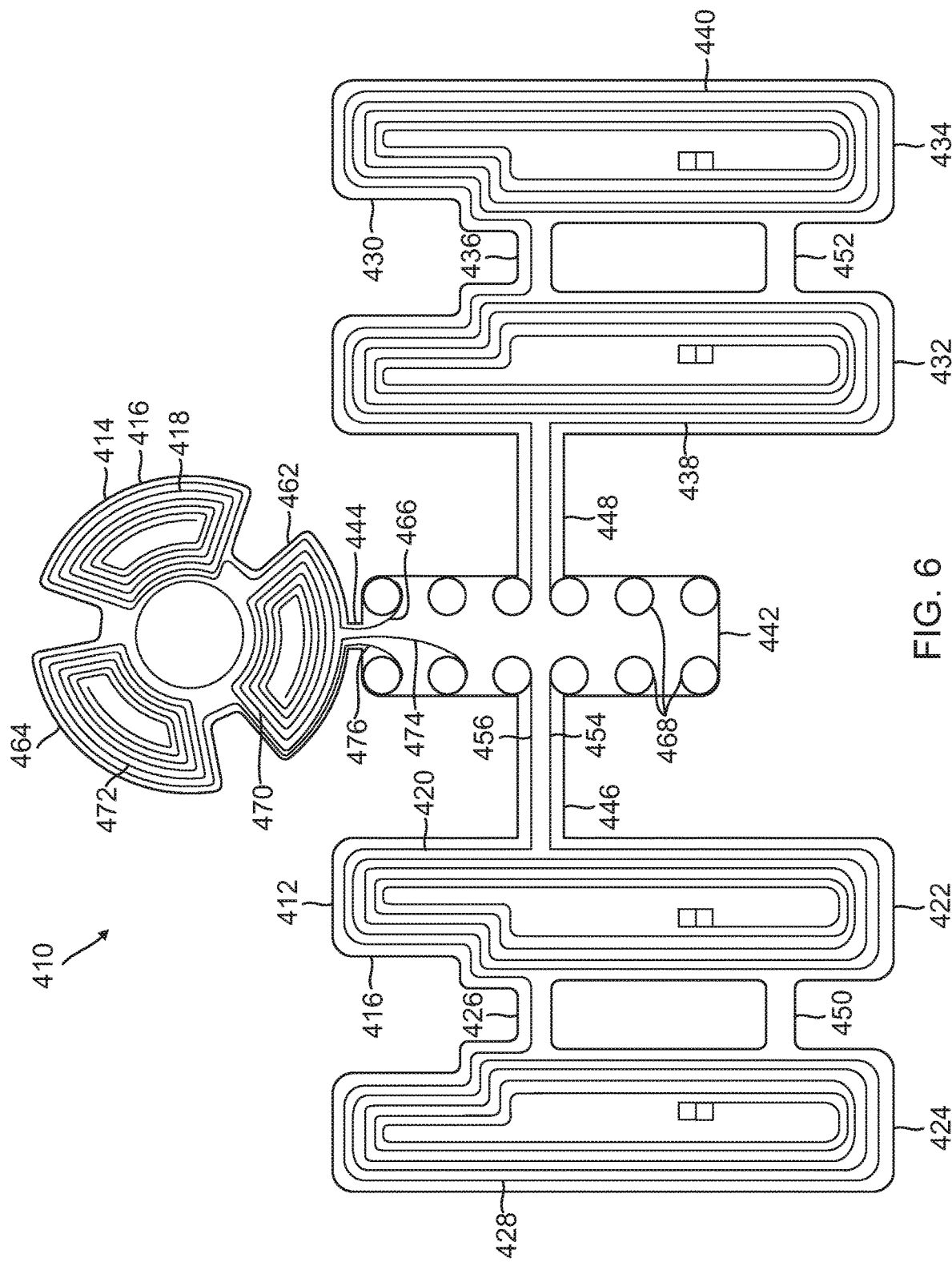
FIG. 6 depicts another flexible circuit.

FIG. 6 reflects a flexible circuit 410 that may be employed within a catheter, such as catheter 14, to provide signals concerning location and force to a processor in console 24. Flexible circuit 410 includes a substantially planar substrate 412 having a first portion 414 of a first shape (e.g., circular or trefoiled as shown) and a second portion 416 of a second shape (e.g., substantially rectangular or polygonal as shown). First portion 414 and second portion 416 are typically of different shapes because, as will be explained below, second portion 416 is assembled parallel to the longitudinal axis of the catheter, such that it should be elongate, whereas first portion 414 is assembled transversely to the longitudinal axis of the catheter, such that it should conform to the inner diameter of the catheter (i.e., have a maximum width or diameter that is less than or about equal to the inner diameter of the catheter). Nonetheless, shapes of first portion 414 and second portion 416 may be similar. Substrate 412 may be formed of any suitable material that is non-conductive and can resist high temperatures, e.g., polyimide or polyamide.

Substrate 412 may also include additional portions, such as third portion 430 and fourth portion 442. Each of these portions may further include various segments. As noted, first portion 414 may be of a trefoil shape. Thus, it may have three segments, i.e., segments 460, 462, and 464. Second portion 416 may include segment 422 and segment 424, and at least one connector segment, such as 426 or 450, which connect segment 422 to segment 424. Third portion 430 may have a similar structure to second portion 416, and may include segment 432 and segment 434, and at least one connector segment, such as 436 or 452, which connect segment 432 to segment 434. Fourth portion 442 may include at least three connector segments 444, 446 and 448, which connect fourth portion 442 to first, second, and third portions 414, 416, and 430.

Electrical components may be incorporated into substrate 412 and its various portions and segments. For example, substantially planar coils or traces used to measure signals relating to force (i.e., force-sensing coils or traces) may be incorporated onto first portion 414. Specifically, coil 418 may be incorporated with segment 460, coil 470 may be incorporated with segment 462, and coil 472 may be incorporated with segment 464. Coils 418, 470, and 472 may be discrete from each other, as shown, or they may each be connected to one or both of the others. Portions of each coil, or extensions thereof, may extend from the coil to solder joints 468 located on fourth portion 442 and be soldered thereto. Where the three coils are discrete from each other, each should include a respective extension 466, 474, and 476). However, where the three coils are connected, only one or two extensions may be necessary. Where the coils are discrete from each other, the signals generated in each of the coils may be used to provide additional details of force, such as an indication of an off-center force or an off-axis direction of the force. Further, catheter 14 may be assembled such that segments 460, 462, and 464 may be aligned, respectively, with sectors 210, 212, and 214. Thus, signals generated in coils 418, 470, and 472 may be used by processor 22 to provide different determinations of force upon each of the sectors. As shown, each coil on first portion 414 includes approximately five turns. However, because signal strength is a function of the number of turns, the number of turns may be maximized based on the size of each segment and the pitch that the lithographic process can accomplish.

Planar coils or traces used to measure signals relating to location (i.e., location coils or traces) may also be incorporated into second portion 416 and third portion 430. Coil 420 may be incorporated with segment 422, coil 428 may be incorporated with segment 424, coil 438 may be incorporated with segment 432, and coil 440 may be incorporated with segment 434. Each of these coils may extend to solder joints 468 on fourth portion 442. For example, coil 420 may include an extension 454 that connects to a solder joint 468 via connector segment 446 and coil 428 may include an extension 456 that connects to a solder joint 468 via connector segment 426, segment 422 and connector segment 446. As shown, each coil on first and second portions 416 and 430 includes approximately five turns. However, because signal strength is a function of the number of turns, the number of turns may be maximized based on the size of segments 422, 424, 432, and 434, and the pitch that the lithographic process can accomplish.

Various symmetries are reflected in FIG. 6. For example, the entire substrate is symmetric about a midline passing through the center of first portion 414, such that second portion 416 is laterally disposed to one side of first portion 414 and fourth portion 442 and such that third portion 430 is laterally disposed to the other side of first portion 414 and fourth portion 442. Thus, fourth portion 442 is disposed between first portion 414, second portion 416 and third portion 430. Further, segments 422 and 424 mirror each other, and, with the exception of extension 456, coil 420 mirrors coil 428. The same is true for segments 432 and 434, as well as coils 438 and 440. Accordingly, and as shown, the wind of coils 420 and 432 may be clockwise (i.e., have a clockwise orientation) whereas the wind of coils 428 and 434 may be counterclockwise (i.e., have a counterclockwise orientation). Alternatively, the wind of coils 420 and 432 may be counterclockwise and the wind of coils 428 and 434 may be clockwise.

Figure 7:
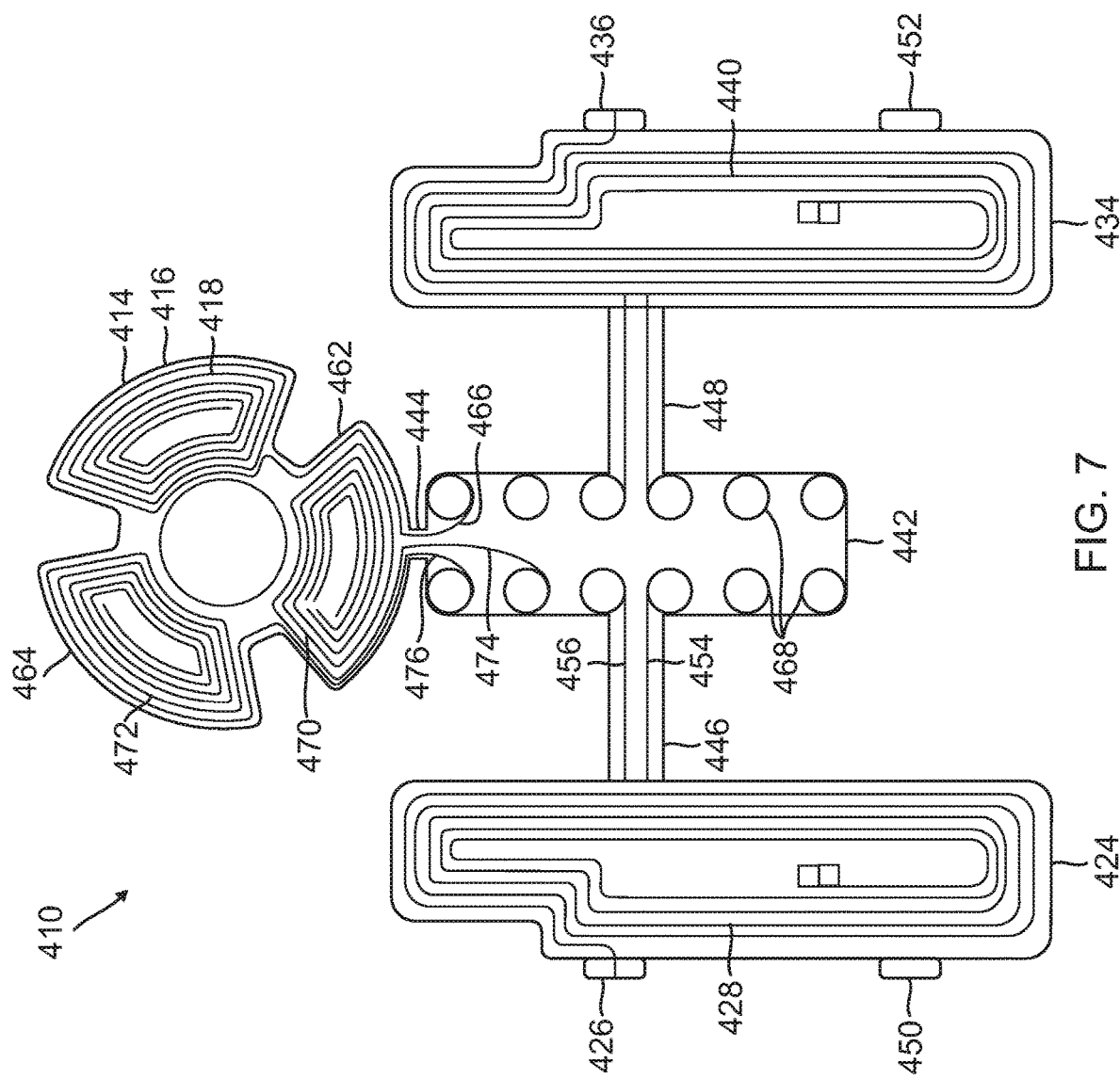

Substrate 412 may be a single layer. Alternatively, it may include between two and ten layers, e.g., four layers. Each layer is identical to the others, including the shapes of the various portions, segments, and coils described above. In this manner the coils may be thickened by adding layers. However, thickening by layers results in increased non-linearity of signal yield. The flexibility of flexible circuit 410 enables a solution to this tradeoff. Specifically, referring to FIG. 7, by deforming or bending connector 426 and connector 450, segment 424 may be folded on top of segment 422 to contact it and overlap it such that coil 428 aligns with coil 420. Similarly, by deforming or bending connector 436 and connector 452, segment 434 may be folded on top of segment 432 to contact it and overlap it such that coil 440 aligns with coil 438. Although connectors 450 and 452 are optional, they may assist aligning the coils with each other by reducing relative rotation between the segments. If substrate 412 is four layers, for example, then after segment 424 is folded onto segment 422, coils 420 and 428 form a combined coil having eight layers. The yield of this combined coil does not suffer from increased non-linearity as would the eight-layer coil fabricated in an eight-layer substrate.

An advantage that a thinner substrate (e.g., four layers) has over a thicker substrate (e.g., eight layers) is that it is easier to deform or bend, which is helpful for assembling flexible circuit 410 to other catheter components and ultimately for fitting it within the inner-diameter envelope of the catheter, as will be detailed below. Accordingly, flexible circuit 410 allows for a thick coil without increased non-linearity of the signal and increased stiffness of the substrate.

Figure 8:
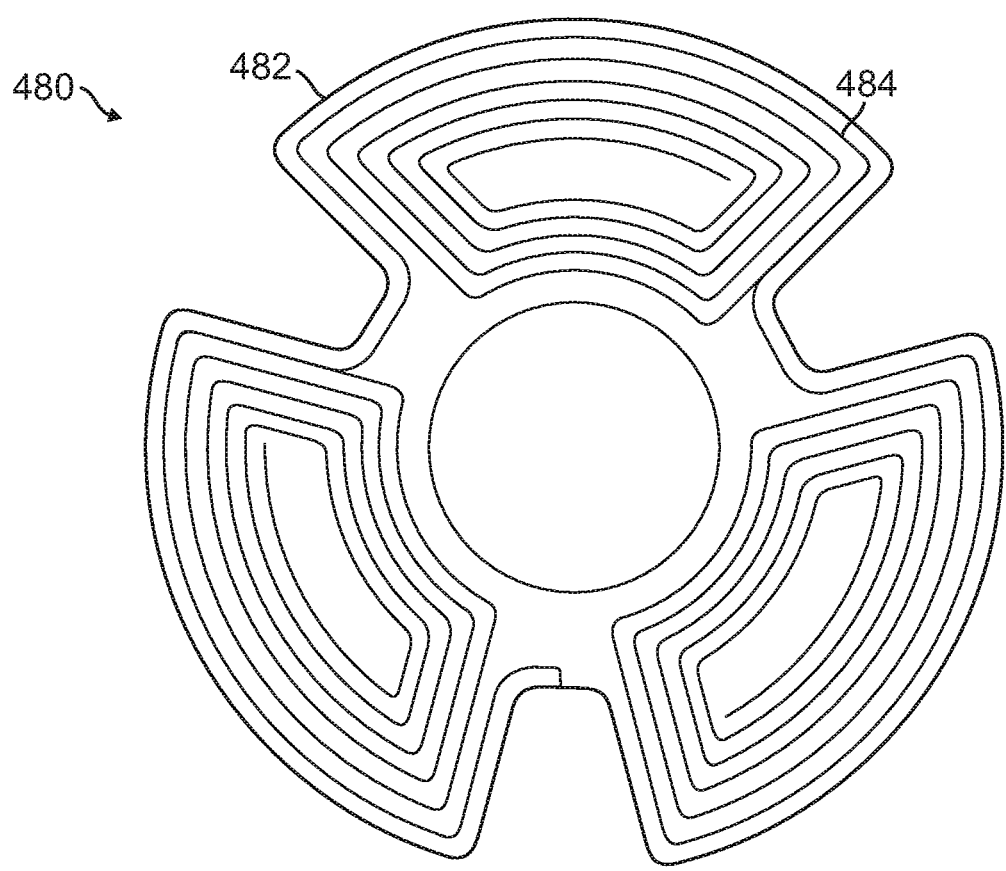
FIG. 8 depicts yet another flexible circuit.

FIG. 8 reflects another component of catheter 14, flexible circuit 480, which includes substrate 482 and coil or coils 484. The structure of flexible circuit 480 is similar to the structure of first portion 414 of flexible circuit 410. However, in various embodiments, the number or pitch of the coils may vary, and the various coils on the three segments may be discrete from each other or integrated with each other.

Figure 9:
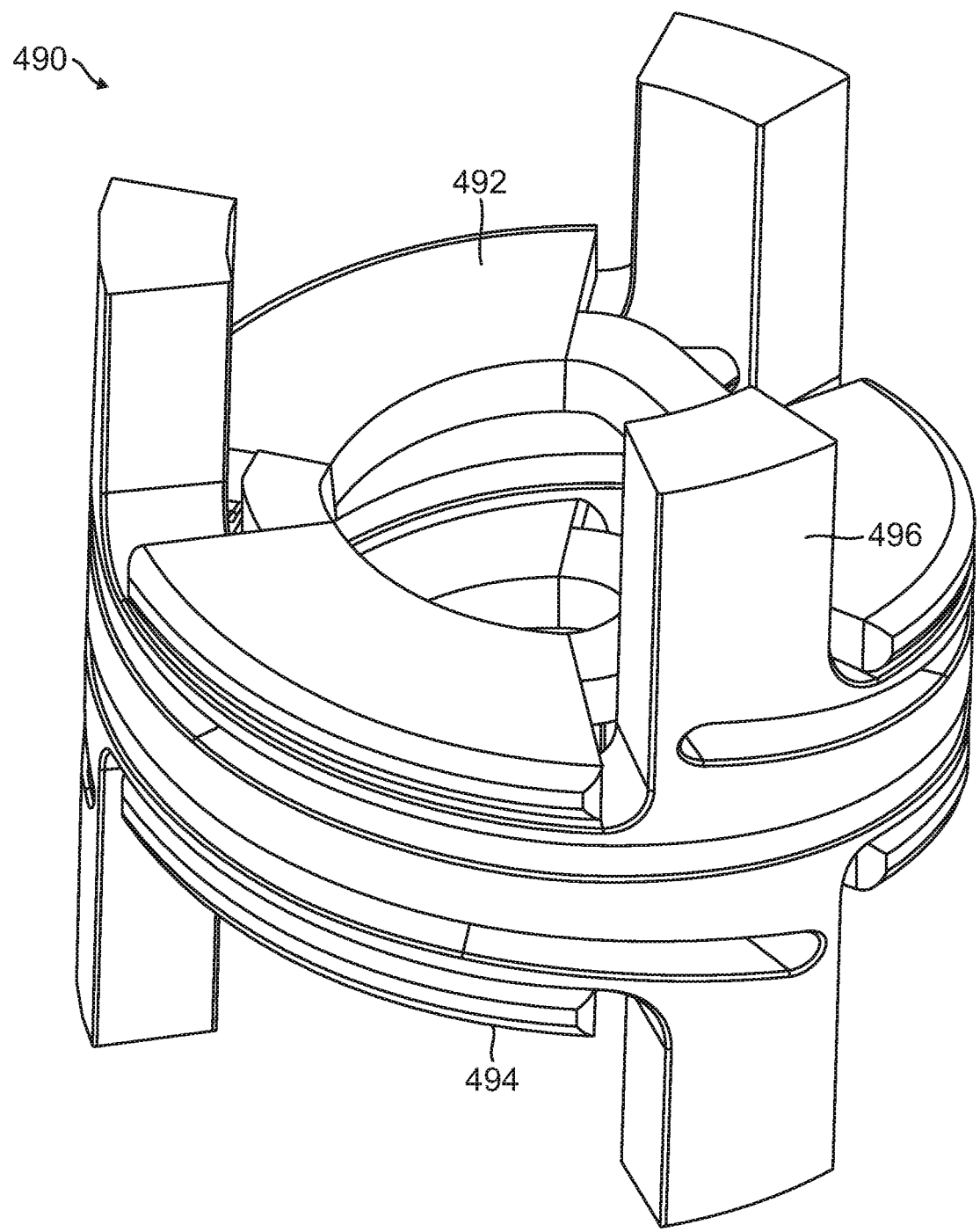
FIG. 9 depicts a spring component.

FIG. 9 reflects another component of catheter 14, helical spring 490, that includes a top face 492, a bottom face 494, and various arms 496 that may be used to assemble spring 490 to other components of catheter 14. Spring 490 has a known or predetermined spring constant that relates distance to force in accordance with Hooke's law. Together flexible circuit 480, first portion 414 of flexible circuit 410, and helical spring 490 make up a sub-assembly that may receive electrical signals from and provide electrical signals to console 24, which may be processed to determine forces, e.g., sub-gram forces, exerted on tip 18, (or tip 200 or tip 300, as the case may be) of catheter 14. Specifically, a first cable or cables (within cable-bundle 498 of FIGS. 10 and 11) that connects to console 24 on one end may be also connected at the opposite end to solder joints 468 of fourth portion 442 of flexible circuit 410 that are connected via coil extensions 466, 474, and 476 to coils 418, 470, and 472 on segments 460, 462, and 464 of first portion 414, respectively. A second cable or cables (also within cable-bundle 498) that connects to console 24 on one end may also be connected at the opposite end to coil or coils 484 on flexible circuit 480. Electrical signals from console 24, e.g., having RF frequencies, may be used to power either the coils on the first portion of flexible circuit 410 or the coils on flexible circuit 480. Whichever set of coils receives power from console 24 may be considered a transmitter because it emits an electromagnetic field that varies in accordance with the frequency of the signals received from console 24. The set of coils that is not powered by console 24 may be considered a receiver inasmuch as it functions like an antenna in response to the electromagnetic field from the transmitter. Thus, the receiver generates electrical signals that may be conveyed to console 24 for analysis. The electrical signals generated by the receiver depend on the distance between the receiver and the transmitter, such that the electrical signals generated by the receiver may be correlated to the distance between the receiver and the transmitter.

By adhering the receiver (here, the coils on first portion 414 of flexible circuit 410) to top face 492 of spring 490 and the transmitter (here, the coils on flexible circuit 480) to the bottom face of spring 480, and wiring them as described above, electrical signals generated in the receiver may be correlated to compression displacement in the spring (e.g., on the order of 100 nanometers) and thus to forces against tip 200 or 300 of catheter 14 that cause spring 480 to compress. In use, console 24 with processor 22 may process these signals and use them to confirm that contact has been made between tip and tissue, and to regulate the amount of ablation energy supplied to electrodes. For example, when the signals indicate that the spring is in a relaxed state (i.e., no compression) this may be perceived as an indicator that tip 200 or 300 does not contact tissue, and therefore, no ablation energy should be supplied to the electrodes. Indicators of the information (e.g., in units of force, such as newtons) may further be provided to operator 16 on monitor 29. This information may be useful to provide directly to operator 16 insofar as it may help operator 16 avoid damaging tissue by pressing the tip against it too hard.

Furthermore, each of the three portions of the trefoiled shapes of first portion 414 of flexible circuit 410 and flexible circuit 480 may be aligned with each other and with the three sectors 210, 212, and 214 of tip 200, such that differences in contact force from tissue against the three sectors may be determined by processor 22. Accordingly, processor 22 may determine, e.g., that the greatest contact force against tissue is experienced by sector 210, the second greatest contact force against tissue is experienced by sector 212, and the least contact force against tissue is experienced by sector 214. Thus, processor 212 may use the force data alone or in combination with the ECG data from these sectors, to tailor the RF energy applied to each of the sectors' electrodes for ablating tissue. Further, the user may observe information concerning force of contact of each of the three sectors on display 29 and use it to determine which sectors contact tissue and to adjust the position of tip 200 to achieve desired contact forces against tissue.

Top face 492 and bottom face 494 of spring 490 may be parallel to each other oriented transversely to the longitudinal axis of the spring (e.g., at an angle of greater than about sixty degrees and less than ninety degrees, e.g., about eighty degrees). Accordingly, the receiver and the transmitter, affixed thereto, are similarly angulated. However, non-perpendicular angulation increases the sensitivity of the receiver because the distance between the transmitter and receiver is minimized as compared to if they were provided perpendicular to the spring's longitudinal axis, and ultimately the catheter's longitudinal axis. Such angulation may further assist in distinguishing relative forces exerted against the three tip sectors.

Figure 10:
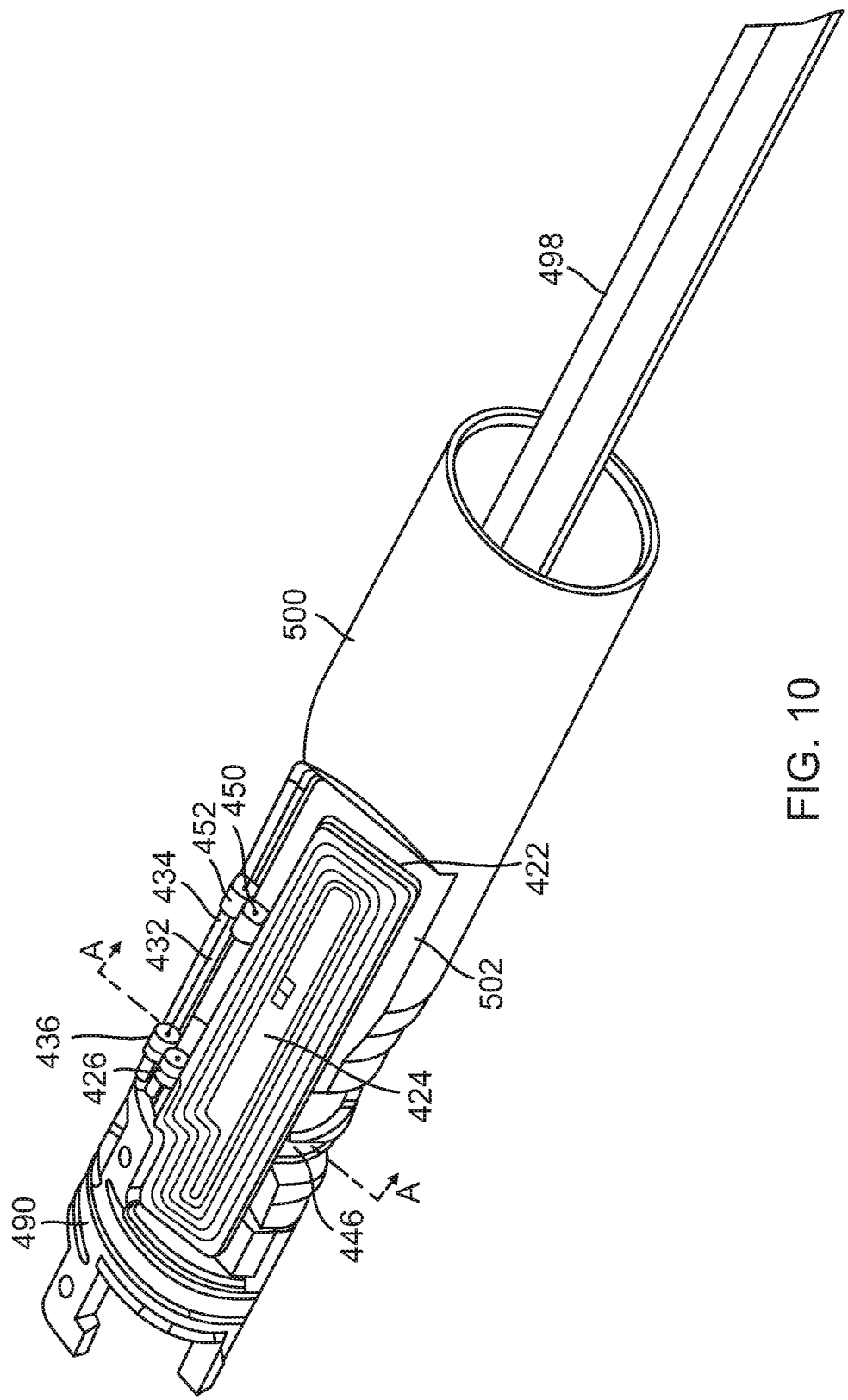
FIG. 10 depicts the distal portion of the catheter of FIG. 3 in a partially assembled configuration.
Figure 11:
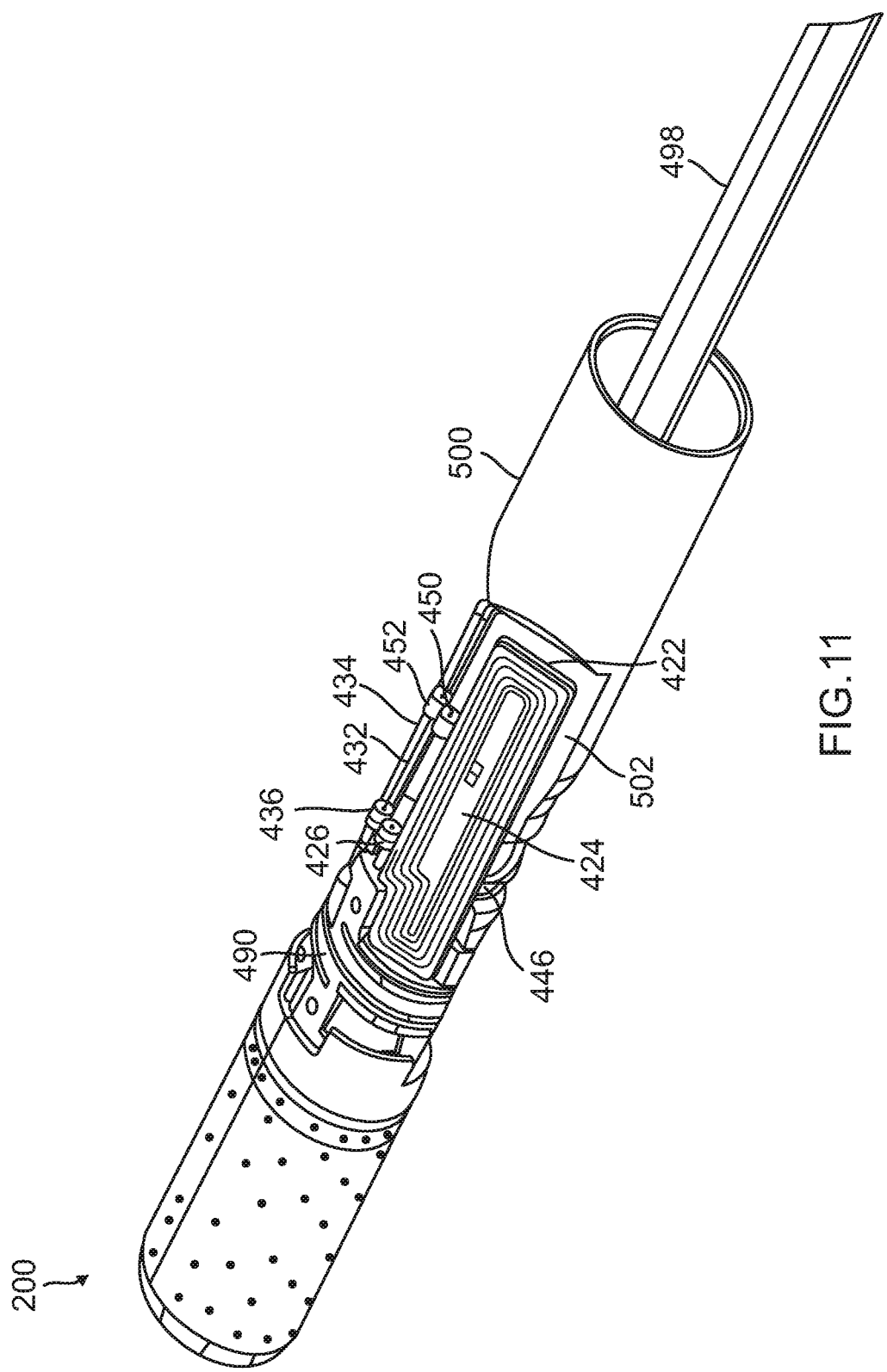
FIG. 11 depicts the distal portion of the catheter of FIG. 3 in a further partially assembled configuration.
Figure 12:
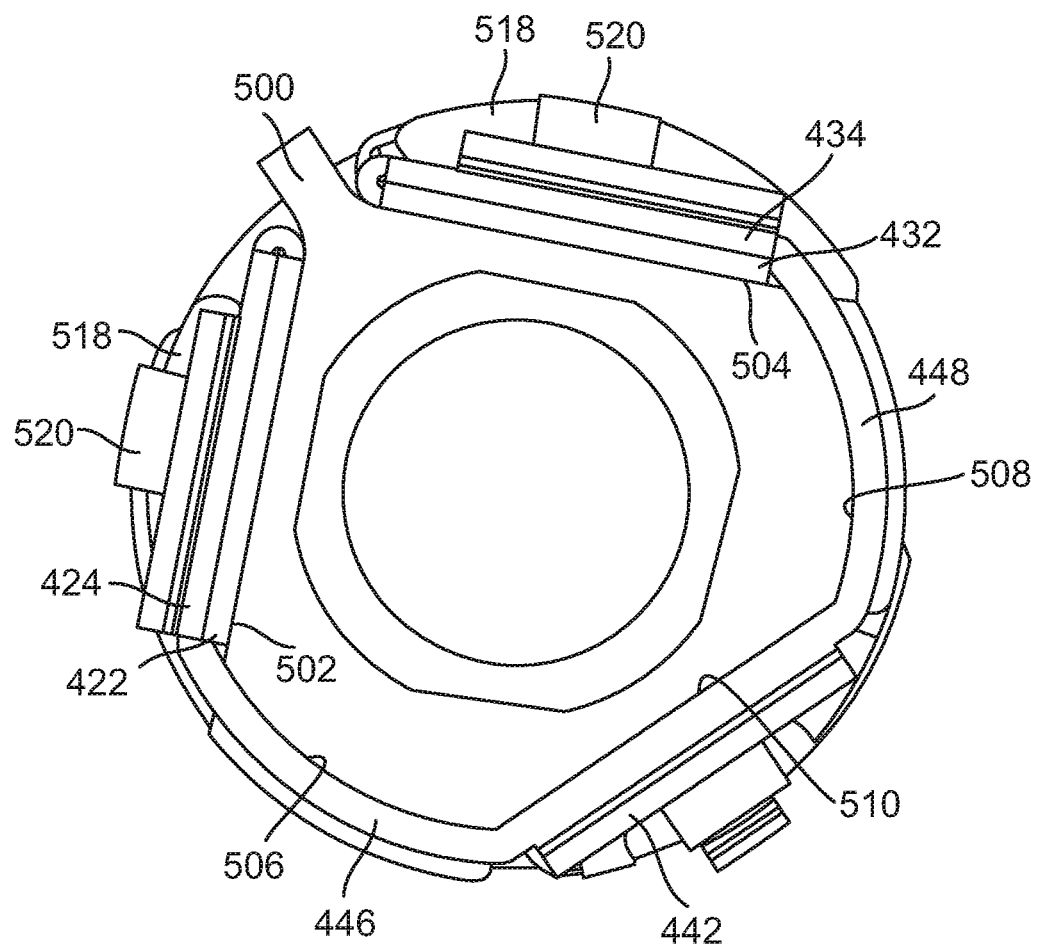
FIG. 12 depicts a cross section taken through line A-A of FIG. 10.

FIGS. 10 and 11 show catheter 14 at two different steps of its assembly. FIG. 12 is a cross section of catheter 14 taken along line A-A in FIG. 10, but with various components removed or simplified for clarity concerning further discussion of flexible circuit 410. FIG. 10 shows flexible circuit 410 as assembled to spring 490 and a coupling sleeve 500. Although not seen, first portion 414 of flexible circuit 410 is adhered to top face 492 of spring 490 and flexible circuit 480 is adhered to bottom face 494 of spring 490. In FIG. 11, tip 200 is shown attached to spring 490. Also shown in FIGS. 10 and 11 is cable bundle 498. Cable bundle 498 includes a set of cables, which, although not visible, are connected to solder joints 468 on fourth portion 442 of flexible circuit 410, and thus to the various coils or traces on flexible circuit 410, and to coils or traces 484 on flexible circuit 480. As seen in FIGS. 10-12, flexible circuit 410 is no longer planar. Rather, it has been deformed to have a shape that has a cross section that is partially circular and partially triangular. Segment 424 of second portion 416 is the most readily visible segment of flexible circuit 410 in FIGS. 10 and 11. Various sides of segment 422, segment 432, and segment 434, as well as connectors 426, 436, 446, 450, and 452 are also visible in these figures. As seen these connectors have been deformed into bent or curved configurations for attachment to coupling sleeve 500. Specifically, segment 422 is adhered to a substantially planar surface 502 of sleeve 500 and segment 432 is adhered to a substantially planar surface 504 of sleeve 500. So assembled, these portions of flexible circuit 410 may be viewed as having a triangular cross section. Further, connector 446 is adhered to a circular (or arcuate) surface 506 of sleeve 500 and connector 448 is adhered to a circular (or arcuate) surface 508 of sleeve 500. So assembled, these portions of flexible circuit 410 may be viewed as having a circular (or arcuate) cross section. Fourth portion 442 may further be adhered to substantially planar surface 510 of sleeve 500.

The diameter or width of the circular portion of the cross section of flexible circuit 410 as assembled to sleeve 500 is equal or approximately equal to the diameter or maximum width of first portion 414, which is also equal or approximately equal to the maximum width (or base) of the triangular portion of the cross-section of flexible circuit 410 as assembled to sleeve 500. Accordingly, as assembled, flexible circuit 410, may be readily inserted into an outer tube or sleeve that provides an outer surface of catheter 14 and that defines the inner diameter within which componentry (e.g., flexible circuit 410, spring 480, sleeve 500) of catheter 14 must fit. To help prevent soft spots under the outer sleeve that result from gaps between the substantially planar outer surfaces of segments 424 and 434, and portion 442 on the one hand, and the curvature of the outer sleeve on the other hand, these gaps may be filled by including additional material, e.g., adhesives 518 and polyimide layers 520, on segments 424 and 434 (of second portion 416 and third portion 430, respectively) and portion 442. The polyimide layers 520 may be fabricated separately from flexible circuit 410 and adhered thereto, or they may be an integral portion of flexible circuit 410, formed during the same lithographic process as the remainder of flexible circuit 410. Polyimide layers 520 may interpolate the curve of the outer sleeve with a series of substantially planar steps or layers.

Flexible circuit 410 may be assembled into catheter 14 as follows. First, flexible circuit 410 may be provided. Segment 424 of second portion 416 may be folded over segment 422 of second portion 416 to overlap it and contact it by deforming connector 426 and, if included, connector 450. Segment 434 of third portion 430 may be folded over segment 432 of third portion 430 to overlap it and contact it by deforming connector 436 and, if included, connector 452. First portion 414 of flexible circuit 410 may be oriented to be parallel to top face 492 of spring 490, which is oriented transversely (e.g., less than thirty degrees from perpendicular) to a longitudinal axis of spring 490. First portion 414 may then be adhered to top face 492 of spring 490. A coupling sleeve 500 having substantially planar surface portions may be provided and oriented to align its longitudinal axis with the longitudinal axis of the spring. Second portion 416 and third portion 430 may be oriented to be parallel to respective substantially planar surface portions of sleeve 500. Then, second portion 416 and third portion 430 may be adhered to the respective substantially planar surface portions of sleeve 500. Sleeve 500, adhered to flexible circuit 410, may then be coupled or inserted into the outer sleeve. Finally, tip 18 may be affixed to spring 490. Flexible circuit 480 may be adhered to bottom face 494 of spring 490 at nearly any step of the process so long as tip 18 has not been attached to spring 490.

By virtue of the embodiments illustrated and described herein, Applicant has devised a method of ablating tissues selectively along a tissue surface, e.g., a curved tissue surface, in contact with a some or all of a flexible-circuit tip of a diagnostic/therapeutic catheter, while using other sectors of the tip, particularly those not in contact with tissue, to provide functions besides ablations, such as monitoring of electromagnetic signals (e.g., ECG signals). That is, a user may use the diagnostic/therapeutic catheter described above or the electrophysiology system of which it may be a part, according to various methods and variations to activate at least one electrode while maintaining inactive the other electrodes or using them to provide functions besides ablations, such as monitoring of electromagnetic signals (e.g., ECG signals), while further measuring temperature using some or all of the various temperature sensors disposed on the catheter tip. One such method and variations may include the following steps. First, a user may receive the catheter. Then the user may introduce the catheter into a subject, e.g., a human subject, and position the catheter proximate to heart tissue. Second, the user may contact the catheter's tip against the heart tissue. Third, a processor connected to the catheter may receive temperature data, ECG signals via the catheter's tip sectors (e.g., 210, 212, 214), and force signals via the catheters receiving and transmission coils 118 and 184). The processor may use either the ECG signals, the force signals, or both to determine which the tip sectors are in contact with tissue (at least partially so), and those that are not. Fourth, the processor may then control delivery of ablation energy to only those tips that are in contact with tissue. In those instances where multiple tip sectors contact tissue, the multiple tip sectors in contact with tissue may receive ablation energy, either simultaneously or in succession (as explained above). Similarly, these multiple tip sectors may monitor ECG signals simultaneously or in succession. In an exemplary variation where all three tip sectors contact tissue, tip sector 210 may receive ablation energy while sectors 212 and 214 provide ECG signals to the processor, then sector 210 may be switched from receiving ablation energy to providing ECG signals and sector 212 may be switched from providing ECG signals to receiving ablation energy, then, sector 212 may be switched back to providing ECG signals and sector 214 may be switched from providing ECG signals to receiving ablation energy. In further variations, at least the temperature sensors may provide temperature data to the processor at least while the sector on which they are disposed receives ablation energy. However, all of the temperature sensors may continuously provide temperature data to the processor.

Further, a diagnostic/therapeutic catheter having the features described above may be built in accordance with the following method and variations thereof. First, a flexible circuit (e.g., flexible circuit 100) may be fabricated, via a lithographic process. For example, a layer of an insulative material (e.g., polyamide) may be deposited, which gray be a substrate for electronic componentry. Next, a layer of a conductive material (e.g., platinum or gold) comprising the electronic componentry (e.g., thermocouple 118, conductor element 126, and contact 146) may be deposited. Next, another layer of insulative material may be deposited. Next, another layer of a conductive material may be deposited. Mask layers may also be deposited to achieve particular shapes and configurations of the layers. For example, mask layers may be used to create different segments of the flexible circuit (e.g., segments 102 and 104), sectors thereof (e.g., sectors 110 and 114), and to shape the electronic componentry. A further step of creating ports (e.g., irrigation ports 134) through the flexible circuit (e.g., via laser drilling) may be performed if such ports were not fabricated in the preceding steps.

Second, flexible circuit 100 may be received, along with other components for building the diagnostic/therapeutic catheter, e.g., catheter body 14. Other components may also be received, e.g., a core, such as core 235, and electrodes not fabricated as an integral part of flexible circuit 100, such as electrodes 32. Additionally, flexible circuits 410 and 480 may be received to impart force measurement functionality to the catheter.

Third, flexible circuit 100, which may be received in a planar configuration, may have at least its second segment formed into a non-planar configuration, e.g., a cylindrical configuration. In so doing, the flexible circuit may be formed into a flexible-circuit tip (e.g., 200). The flexible-circuit tip may then be connected, typically by the second segment, to the catheter body. Fourth, in some variations, conductor element(s) (e.g., 132) may be connected to electrodes 32.

Fifth, lead wires may be connected to contacts (e.g., 142) on solder pads (e.g., 136) that are operatively connected to the electronic componentry of the flexible-circuit tip, as well as flexible circuits 410 and 480. Sixth, spaces between the various sectors of the flexible-circuit tip may be filled with an insulation material.

In those variations of the method that include providing a core, the flexible circuit may be conformed to the core to change its configuration into that of the flexible-circuit tip. In other variations of the method that include providing a core, the flexible-circuit tip may be attached to the core. Further, an insulation material may be disposed in a space between the core and the flexible-circuit tip.

Any of the examples or embodiments described herein may include various other features in addition to or in lieu of those described above. The teachings, expressions, embodiments, examples, etc., described herein should not be viewed in isolation relative to each other. Various suitable ways in which the teachings herein may be combined should be clear to those skilled in the art in view of the teachings herein.

Having shown and described exemplary embodiments of the subject matter contained herein, further adaptations of the methods and systems described herein may be accomplished by appropriate modifications without departing from the scope of the claims. In addition, where methods and steps described above indicate certain events occurring in certain order, it is intended that certain steps do not have to be performed in the order described but in any order as long as the steps allow the embodiments to function for their intended purposes. Therefore, to the extent there are variations of the invention, which are within the spirit of the disclosure or equivalent to the inventions found in the claims, it is the intent that this patent will cover those variations as well. Some such modifications should be apparent to those skilled in the art. For instance, the examples, embodiments, geometrics, materials, dimensions, ratios, steps, and the like discussed above are illustrative. Accordingly, the claims should not be limited to the specific details of structure and operation set forth in the written description and drawings.

We claim:

1. A flexible circuit, comprising:
   a first planar segment comprising a plurality of teeth arranged in a geared pattern and a plurality of holes disposed entirely through the first planar segment, the first planar segment having a first portion and a second portion, in which the plurality of holes are positioned in the second portion; and
   a second planar segment comprising:
      a first layer including a non-conductive substrate,
      a second layer including conductive materials comprising at least a first temperature sensor, a second temperature sensor, and a conductor element,
      a third layer including an insulator,
      a first sector comprising a first portion of the first layer, a first portion of the second layer, and a first portion of the third layer, and
      a second sector comprising a second portion of the first layer, a second portion of the second layer, and a second portion of the third layer,
      in which the flexible circuit is configured to be formed onto a core of a catheter body, the core having a lateral surface, a base disposed perpendicular to the lateral surface, and a curved surface connecting the lateral surface to the base, such that the second planar segment conforms to the lateral surface and such that the first portion of the first planar segment conforms to the base and the second portion of the first planar segment conforms to the curved surface.

2. The flexible circuit of claim 1, further comprising a first space disposed only through the conductive materials of the second layer between the first sector and the second sector.

3. The flexible circuit of claim 2, further comprising a first insulation material disposed within the first space.

4. The flexible circuit of claim 3, in which the first temperature sensor and the second temperature sensor are disposed in the first sector, and a third temperature sensor and a fourth temperature sensor are disposed in the second sector.

5. The flexible circuit of claim 4, in which the second planar segment further includes a third sector, the third sector having a fifth temperature sensor and a sixth temperature sensor, and in which the second layer comprises a second space disposed only through the conductive materials of the second layer between the second sector and the third sector.

6. The flexible circuit of claim 5, in which the conductor element includes a trace connected to an ablation electrode.

7. The flexible circuit of claim 6, in which the first sector, the second sector, and the third sector each include a respective solder pad having a first contact operatively coupled to a respective thermocouple, a second contact operatively coupled to another respective thermocouple, and a third contact operatively coupled to a respective electrode.

8. The flexible circuit of claim 7, in which the first planar segment includes a first-segment substrate and a first-segment insulator.

9. The flexible circuit of claim 8, in which the first planar segment further includes a first-segment temperature sensor.

10. The flexible circuit of claim 9, in which the first planar segment further includes a first-segment electrode.

11. The flexible circuit of claim 3, in which the insulator comprises polyamide, polyimide, liquid crystal polymer, or polyurethane.

12. The flexible circuit of claim 3, in which the first insulation material includes a high-temperature epoxy.

13. The flexible circuit of claim 3, in which the insulator of the third layer comprises a ceramic material.

14. The flexible circuit of claim 1, in which the lateral surface of the core comprises a cylindrical shape.

15. The flexible circuit of claim 14, in which the first layer consists a single non-conductive substrate.

16. The flexible circuit of claim 14, in which the first sector and the second sector of the second planar segment are spaced from each other such that, when conformed to the lateral surface of the core, the first sector and the second sector are spaced from each other.

* * * * *